(12) United States Patent
Kurani et al.

(10) Patent No.: US 11,084,318 B2
(45) Date of Patent: Aug. 10, 2021

(54) MULTIFUNCTIONAL WRITING DEVICE FOR AUTOMATIC EXAM PROCTORING AND GRADING

(71) Applicants: hetal b. Kurani, Sunnyvale, CA (US); hemal b. kurani, Sunnyvale, CA (US)

(72) Inventors: hetal b. Kurani, Sunnyvale, CA (US); hemal b. kurani, Sunnyvale, CA (US)

( * ) Notice: Subject to any disclaimer, the term of this patent is extended or adjusted under 35 U.S.C. 154(b) by 0 days.

(21) Appl. No.: 17/165,872

(22) Filed: Feb. 2, 2021

(65) Prior Publication Data

US 2021/0155030 A1 May 27, 2021

Related U.S. Application Data

(63) Continuation-in-part of application No. 16/385,473, filed on Apr. 16, 2019, now abandoned, and a continuation-in-part of application No. 15/897,157, filed on Feb. 15, 2018, now abandoned.

(51) Int. Cl.

| | | |
|---|---|---|
| *B43K 29/00* | (2006.01) | |
| *B43L 9/02* | (2006.01) | |
| *B43L 7/027* | (2006.01) | |
| *B43K 29/08* | (2006.01) | |
| *B43K 27/02* | (2006.01) | |
| *B43K 29/10* | (2006.01) | |

(52) U.S. Cl.
CPC .............. *B43K 29/08* (2013.01); *B43K 27/02* (2013.01); *B43K 29/001* (2013.01); *B43K 29/004* (2013.01); *B43K 29/10* (2013.01); *B43L 7/0275* (2013.01); *B43L 9/02* (2013.01)

(58) Field of Classification Search
CPC ...... B43K 29/08; B43K 27/02; B43K 29/004; B43K 29/001; B43K 29/10; B43L 7/0275; B43L 9/02
USPC ......................................................... 33/474
See application file for complete search history.

(56) References Cited

U.S. PATENT DOCUMENTS

| | | | | |
|---|---|---|---|---|
| 1,539,912 A | * | 6/1925 | Peterson | G01C 9/24 33/332 |
| 1,544,471 A | * | 6/1925 | Miller | G01B 3/06 33/458 |
| 1,725,263 A | * | 8/1929 | Fleischman | B25H 7/04 33/473 |
| 5,836,081 A | * | 11/1998 | Orosz, Jr. | G01C 15/008 33/290 |
| 5,894,675 A | * | 4/1999 | Cericola | G01B 3/00 33/451 |

(Continued)

*Primary Examiner* — Yaritza Guadalupe-McCall

(57) ABSTRACT

A multifunctional writing device includes a hollow body, wherein the hollow body comprises one or more cavities configured to store a mechanical pencil, a multifunctional drawing tool, a compass needle, a stylus, an eraser, a USB flash drive, an imaging system, a projector pen, a set of cameras, and attaches a projector stick. The first writing member comprises a mechanical pencil system being provided in a first portion of the hollow body and a touch ID sensitive barrel. A second projector member comprises a projector pen and attaches a projector stick. The first portion of the hollow body is at the opposite end of the second portion of the hollow body. The multifunctional writing device allows for projecting self-leveled and auto calibrated geometry drawing tools. A method for digitizing the written data on paper and a system for secure, auto proctored, and auto grading of examinations is provided.

19 Claims, 24 Drawing Sheets

(56) References Cited

U.S. PATENT DOCUMENTS

| | | | | |
|---|---|---|---|---|
| 6,230,416 B1* | 5/2001 | Trigilio | ............... | B43L 7/027 33/451 |
| 6,578,274 B1* | 6/2003 | Tango, Jr. | ............... | B44D 3/38 33/1 G |
| 6,831,632 B2* | 12/2004 | Vardi | ............... | G06K 9/222 178/19.01 |
| 6,839,974 B1* | 1/2005 | Hitchcock | ............... | B25H 7/00 33/419 |
| 9,827,809 B2* | 11/2017 | Neubauer | ............... | G09B 19/025 |
| 10,001,370 B2* | 6/2018 | Foster | ............... | B25H 7/04 |
| 10,239,200 B2* | 3/2019 | Pepper | ............... | G01B 3/563 |
| D870,810 S* | 12/2019 | Kurani | ............... | D19/133 |
| 10,661,595 B2* | 5/2020 | Kurani | ............... | B43K 29/08 |
| 2004/0259067 A1* | 12/2004 | Cody | ............... | G06F 3/03545 434/323 |
| 2006/0021237 A1* | 2/2006 | Marshall | ............... | G01C 3/08 33/290 |
| 2007/0084073 A1* | 4/2007 | Martin | ............... | G01C 15/08 33/520 |
| 2007/0160971 A1* | 7/2007 | Caldera | ............... | G09B 7/00 434/353 |
| 2007/0277387 A1* | 12/2007 | Morrell | ............... | B43L 12/02 33/429 |
| 2008/0226378 A1* | 9/2008 | Sheu | ............... | B43K 21/006 401/18 |
| 2009/0064516 A1* | 3/2009 | Diaz | ............... | G01C 9/26 33/451 |
| 2009/0253107 A1* | 10/2009 | Marggraff | ............... | G06F 3/0317 434/162 |
| 2012/0036727 A1* | 2/2012 | McCarthy | ............... | B43L 23/00 33/760 |
| 2012/0240419 A1* | 9/2012 | Wagner | ............... | G01B 3/563 33/275 R |
| 2012/0246911 A1* | 10/2012 | Bariteau | ............... | G01C 9/02 29/464 |
| 2012/0317824 A1* | 12/2012 | Kelly | ............... | G01B 3/566 33/286 |
| 2014/0028635 A1* | 1/2014 | Krah | ............... | G06F 3/041 345/179 |
| 2015/0211847 A1* | 7/2015 | Abe | ............... | G01B 21/04 33/503 |
| 2015/0336421 A1* | 11/2015 | Neubauer | ............... | G09B 11/00 434/159 |
| 2019/0070891 A1* | 3/2019 | Kurani | ............... | B43L 9/02 |
| 2020/0079136 A1* | 3/2020 | kurani | ............... | B43K 29/004 |
| 2020/0108653 A1* | 4/2020 | Kurani | ............... | B43K 29/08 |

* cited by examiner

US 11,084,318 B2

MULTIFUNCTIONAL WRITING DEVICE FOR AUTOMATIC EXAM PROCTORING AND GRADING

CLAIM OF PRIORITY

This application is a child application of utility patent Methods and systems of multifunctional writing device, U.S. patent application Ser. No. 15/897,157 filed on Feb. 15, 2018. A continuation application U.S. patent application Ser. No. 16/680,345 was filed on Nov. 11, 2019 and was granted a U.S. Pat. No. 10,661,595 B2 with a patent date May 26, 2020 titled as Methods and systems of multifunctional writing device.

This application is continuation of part of U.S. patent application Ser. No. 16/385,473 filed on Apr. 16, 2019 titled Methods and systems of multifunctional writing device. This application is hereby incorporated in its entirety by reference.

FIELD OF THE INVENTION

This application relates generally to writing instruments, and more specifically to a system, an article of manufacture, and a method of a multifunctional writing device to store technical drawing tools, projecting technical drawing tools images on a surface, virtual auto proctoring, and auto grading of an exam.

DESCRIPTION OF THE PRIOR ART

There are variety of multifunctional writing devices in the art known for their uses as input devices on paper and paperless mediums. These include mechanical pencils and ballpoint pens for paper mediums. The mechanical pencils and ballpoints are usually in the form of an ink cartridge and pencil lead feeder inside the hollow body. After the advent of touch screen devices, passive stylus devices are known to be used as pen input devices on paperless mediums, including touch screen displays with touch-sensitive transparent panels covering the screen. They are made from a material that will not scratch the surface of a touch screen display. The geometry tools like rulers, compasses, protractors, and set squares are usually individual pieces made from various materials. The digital laser level is commonly used by the construction workers to indicate whether a surface is horizontal or vertical using green and red laser lines but does not have the measuring tape projected image with tick marks. There are also devices, systems, and methods for proctoring and grading of a test, a quiz, or an examination. These usually involve computers, mobile devices, webcams, cloud servers, and the remote presence of an instructor, a teacher, or a remote proctor monitoring the administration of the examination.

U.S. Pat. No. 1,544,471 to Miller discloses a combination tool with elements necessary for a carpenter to use in laying out work of various kinds and to make the construction simple. The tools housed are a ruler, caliper, blade, and a pencil. Miller shows that the ruler, caliper, and blade are held into position by a clamping screw. The caliper and blade are stored inside the housing. The pencil is retained inside the pencil holder. Miller discloses a combination tool comprising a stock provided with a longitudinal slot in one edge portion, a blade pivotally connected with the stock at one end thereof and capable of any position between that of perpendicularity to the stock and a folded position within the slot, slide mounted on the blade. A pencil holder is carried by the stock on the edge opposite the slot, means being provided for holding the pencil. Miller discloses a caliper which can be used as a compass needle. Miller discloses one barrel housing for the caliper and blade tools and a separate housing for the pencil. The ruler is attached to the caliper and blade housing. Such combination tools for a carpenter to use, which include a lead pencil, compass needle, and a ruler, have dedicated different tubular housings for each tool, with big clamping screws that take time and effort to open and close the tools, do not work on paperless mediums, are bulky, and have only limited utility in school and work environments and electronic devices with touch screen displays.

U.S. Pat. No. US 2014/0028635A1 to Krah discloses a modular stylus having a base module and an expansion module. The base module can include a stylus tip, a stylus stimulation signal circuit capable of generating a stimulation signal, a processor for controlling the stylus stimulation signal circuit, and a connection interface for selectively connecting the base module to an expansion module that can also include one or more power sources, a camera, audio recorder, communication circuit, gyroscope, accelerometer, laser pointer, and projector. The projector can be used to display an image on a surface and to allow a user to edit a document by moving the stylus across the projected image. The projected images are zoomed and magnified. Unfortunately, the modular stylus does not have a digital-laser level to self-level the projected image and a distance sensor to auto calibrate the projected images to their real-life size units. Projecting self-leveled and auto calibrated images to real-life measurement units for geometry tools like rulers, compasses, protractors, set squares, measuring tapes, geometric drawing templates, T-squares, ellipsographs, and so on is extremely important for carpenters, contractors, masons, construction workers, crane operators, construction inspectors, cost estimators, civil engineers, draftsmen, drywall installers, electricians, gardeners, glaziers, plumbers, painters, tile installers, real estate agents, surveyors, site safety managers, and so on. The modulus stylus of Krah does not have an auto virtual proctoring feature based on cameras, sensors, and methods. It does not support taking traditional pencil or pen notes and simultaneously making a digital copy of everything a person is writing. The auto digitizing and transcribing feature is very important for auto grading of the exam, quiz, or test taken on a traditional paper based medium.

U.S. Pat No. US 20120135388A1 to Foster et al. discloses a system for secure, web-based, proctored examinations. It consists of web-based platform which allows for test delivery beyond a local testing center, with the test delivered directly to the test-taker. Computing devices that have been secured for the taking of an examination allow a student or prospective professional to access an examination wherever there is an internet connection. Secure examinations can be taken under the purview of a proctor either in person or via the internet and utilizing any number of testing environment capture devices. Unfortunately, this method of taking an exam relies on a web-based platform and does not work on paper-based exams. Analyzing the observation data at a proctoring center during the testing routine to detect aberrant behavior in the testing environment requires proctor intervention, and the method lacks a connection to an intelligent multifunctional writing device with transcribing functions which proactively computes the suspicious behavior and may halt the test taking of the exam by the user (student).

U.S. Pat. No. 10,672,286 B2 to Saxon et al. discloses systems and methods for administering and proctoring of a secure online examination utilizing a cloud computing environment. The cloud computing environment provides scalable, shared computing resources such as processing, memory, communications, storage, and other hardware and software resources associated with the online examination. The system discloses a video camera device or other visual and/or audio environment capture device that may be used to generate data of the examination environment surrounding the test taker. A remote proctor may view the data in real time and determine if any visual or audio activity in the examination environment constitutes activity not in accordance with the testing protocol. Unfortunately, the system lacks a simple, easy to use multifunctional writing device, requires a remote proctor, vast costly backend infrastructure, traditional authentication, and verification of the test taker.

U.S. Pat. No. 9,984,582 B2 discloses systems and methods which utilize a distributed server network to allow for the real-time distribution of copies of a data stream uploaded from a computing device which corresponds to an environment surrounding a user (exam taker) during execution of a testing routine for an examination. These copies of the data stream in real time allow proctors as well as other test assessment authorities to "peek in" on the exam taker's environment surrounding the exam. As a result, the environment surrounding the exam taker can be monitored in real time to determine whether any visual or audio activity in the environment constitutes activity not in accordance with the exam protocol. Following an affirmative determination that the exam taker violated an exam-taking protocol, the proctor or other test assessment authority can then make a final or early decision regarding disciplinary action. The system and method lack a multifunctional writing device, rely on an expensive computing environment, invade privacy by peeking into the exam taker's environment surrounding the exam, and do not provide traditional writing device functionality for paper and paperless media.

U.S. Pat. No. 8,374,992 B2 to Meyyappan et al. discloses a pen-based computing system and use of paradigms like those used with physical paper to organize user-generated content captured by a smart pen. Data, such as handwriting gestures, is captured by the smart pen and transferred to a digital domain, such as by being transferred to a computing system. Once in the digital domain, the captured content is organized as virtual pages or virtual notebooks. The disclosure does not include a computing system which includes a projector to project technical tools images, cameras for video recording, geometrical tools, and does not improve the accuracy of the digital text using gyroscopes and other sensors.

U.S. Pat. No. 9,235,772B2 to Zangari et al. discloses a method for digitizing notes which comprises the steps of writing one or more notes on at least one page of a notebook, photographing this page with a digital camera, and processing the digital image of the page photographed by said digital camera to convert said notes into digital data. The focus of the disclosed method is on digitizing of the written data on paper using the camera and not on auto grading of the exam, test, or quiz. Also, the disclosure does not include a computing system which includes a projector to project technical tools images, cameras for video recording, geometrical tools, and does not improve the accuracy of the digital text using gyroscopes and other sensors.

Thus, there is a need for multifunctional writing device in a single tubular housing with quick removal from a storage cavity and effortless, quick opening and closing of a tool. The locking mechanism should have no moving parts to bind or wear out. The multifunctional writing device should be light weight, and the user should be able to use it on paper and paperless media. The multifunctional writing device should be made from Micro-Electro-Mechanical Systems, or MEMS, technology with miniaturized mechanical and electro-mechanical elements allowing it to store traditional technical drawing tools and project virtual images of the technical drawing tools. The multifunctional writing device should also allow audio and video recording, including capturing of handwriting gestures and conversion to digital text. The multifunctional writing device operating methods should allow for auto proctoring, and auto grading or scoring of a quiz, a test, or an exam.

The disclosed invention of multifunctional writing device has a single housing that can conveniently store, a mechanical pencil, eraser, stylus for touch screen, a multifunctional drawing tool comprising: a ruler, protractor, and set square of forty-five-degree (45°) triangle; compass, USB flash drive, touch ID sensitive barrel, imaging system, cameras, microphone, gyroscope, motion sensor, self-leveled and auto calibrated technical drawing tool image projector pen, and projector stick. The multifunctional writing device operating methods allow for auto proctoring, and auto grading of a quiz, a test, or an exam.

SUMMARY OF THE INVENTION

A multifunctional writing device includes a hollow body, wherein the hollow body comprises one or more cavities configured to store a mechanical pencil, a multifunctional drawing tool, a compass needle, a stylus, an eraser, a USB flash drive, an imaging system, a projector pen, a set of cameras, and attaches a projector stick. The first writing member comprises a lead, and a mechanical pencil system being provided in a first portion of the hollow body and a touch ID sensitive barrel. A multifunctional drawing tool is magnetically attached by a magnetic lock and stored in a multifunctional drawing tool cavity in the first portion of the hollow body. A compass needle is attached by a magnetic lock and stored in a compass needle cavity and runs on the opposite side of the multifunctional drawing tool cavity in the first portion of the hollow body. A second projector member comprises a projector pen and attaches a projector stick. The multifunctional writing device projector pen and projector stick allow for projecting self-leveled and auto calibrated geometry tools like rulers, compasses, protractors, set squares, measuring tapes, geometric drawing templates, T-squares, ellipsographs, and so on. The first portion of the hollow body is at the opposite end of the second portion of the hollow body. A method for digitizing the written data on paper, and a system for secure, auto proctored, and auto grading of examinations are provided.

Figure 1:
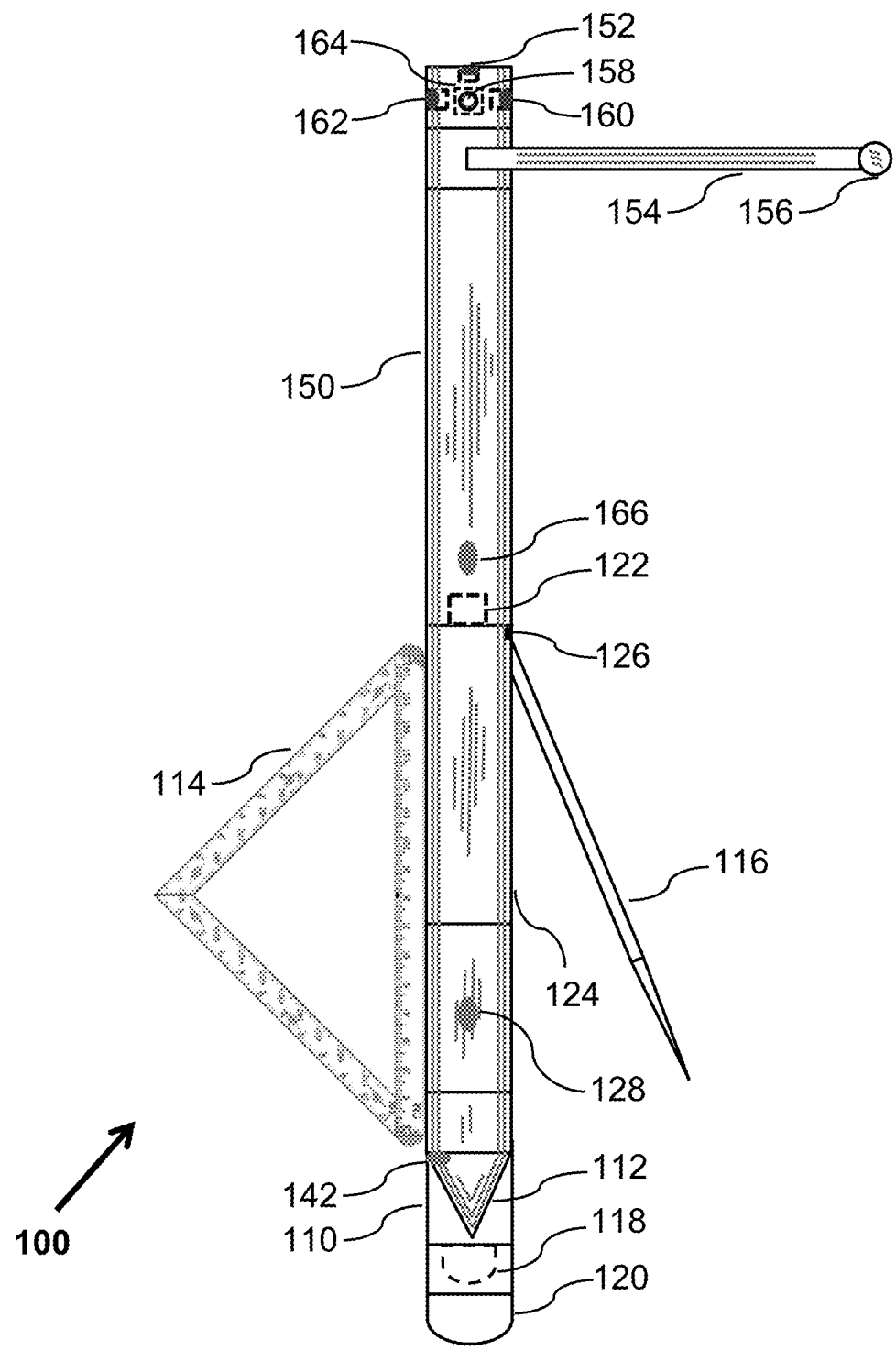
FIG. 1 illustrates a front elevation view of a multifunctional writing device with a mechanical pencil, a multifunctional drawing tool, a compass needle, an imaging system, a projector pen, and a projector stick, according to some embodiments.

The figures described above are a representative set and are not exhaustive with respect to embodying the invention.

DESCRIPTION

Disclosed is a system, method, and article of manufacture for methods and systems of a multifunctional writing device. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," "one example," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of open and closed positions of various drawing tools, buttons to lock and unlock the tools, etc., in order to provide a thorough understanding of embodiments of the invention. One who is skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The disclosed system consists of a multifunctional writing device to write on paper, and a paperless medium like a touch sensitive device. The multifunctional writing device contains various commonly used geometrical drawing tools like a compass needle, and a multifunctional drawing tool comprising a ruler, protractor, and set square of forty-five-degree (45°) triangle. In addition, it contains a self-leveled and auto calibrated technical drawing tool image projector pen and projector stick. The USB flash drive in the first portion of the hollow body can be used for data storage. The imaging system near the tip of the pencil is used for conversion of written text, hand-drawn doodles, and sketches into a digital format. The set of cameras and touch ID sensitive barrel are used for authentication of a user. The GPS sensor provides the location of the multifunctional writing device. The Bluetooth, Wi-Fi, and cellular connection are used to connect with a cloud server and computing device. The set of cameras, microphone, accelerometer, and motion sensor are used for auto proctoring and auto grading of a quiz, a test, or an exam.

The COVID-19 pandemic has resulted in a rise in online learning and conduct of remote quizzes, tests, and exams. The multifunctional writing device allows for use of the device in traditional paper and paperless formats for both synchronous and asynchronous auto proctoring and grading or scoring of quizzes, tests, and exams. Virtual proctoring of an online or remote exam is not scalable and cost effective. The multifunctional writing device allows for three-factor authentications based on touch ID, face ID, and exam ID before the start of an exam. In addition, it records the complete exam session and tags it with suspicious behavior, obviating need for a presence of a physical or real-time virtual proctor. The multifunctional writing device allows for automatic exam proctoring and grading.

The multifunctional writing device allows for projecting self-leveled and auto calibrated to real-life measurement units of geometry tools like rulers, compasses, protractors, set squares, measuring tapes, geometric drawing templates, T-squares, ellipsographs, and so on. These tools are extremely important for carpenters, contractors, masons, construction workers, crane operators, construction inspectors, cost estimators, civil engineers, draftsmen, drywall installers, electricians, gardeners, glaziers, plumbers, painters, tile installers, real estate agents, surveyors, site safety managers, and so on.

Exemplary Definitions

An accelerometer sensor can be used to measure the acceleration or deceleration of forces exerted upon the sensor. Such forces may be static, like the continuous force of gravity or, as is the case with many mobile or moving devices, dynamic, to sense movement or vibrations. The intended use of the accelerometer sensor is to measure the movement of the multifunctional writing device.

An algorithm is a precise, step-by-step plan or set of rules to be followed in calculations or computational procedures or other problem-solving operations, especially by a computer. An algorithm computational procedure begins with an input value and yields an output value in a finite number of steps. The virtual proctoring algorithms used are a computational procedure algorithm to calculate sensor data values, various cluster algorithms, a camera machine vision algorithm, a neural network algorithm, and so on. The algorithms implemented in the method can vary.

An application programming interface (API) can specify how application software components of various systems interact with each other. APIs are source code-based specifications intended to be used as interfaces by application software components to communicate with each other. The API can also be used to create mobile apps to interact with the multifunctional writing device.

Bluetooth is a wireless technology standard for exchanging data over short distances for example, using short-wavelength UHF radio waves in the ISM band from 2.4 to 2.485 GHz from fixed and mobile devices, and building personal area networks (PANS), etc. It is noted that other communication systems which transmit signals with messages from a user's device to recipients can be used as well. Bluetooth wireless technology allows connection of mobile devices to the multifunctional writing device.

A camera is a component or device for recording visual images in the form of photographs, film, or video signals. Cameras can have an artificial intelligence machine vision sensor with multiple functions, such as multifunctional writing device tracking, face recognition, line tracking, and so on. The intended use of the camera is to take photos and videos near the user of the multifunctional writing device which can be used to refine the data and provide types of suspicious activity during auto proctoring when a user is taking an exam. The camera can continually learn new surrounding objects like pet animals, types of objects within the vicinity, and so on, even from different angles and in various ranges. The more it learns, the more accurate it is when it is running its neural network algorithm. The camera, apart from visible light, also has a thermal imager using infrared radiation that allows face ID authentication of the user. The camera sends real-time photo and video data files to the cloud server.

A cloud server is a virtual server running in a cloud computing environment. It is built, hosted, and delivered via a cloud computing platform. Cloud server can be accessed remotely via the internet. A cloud server can involve deploying groups of remote servers and/or software networks that allow centralized data storage and online access to computer application software or resources. These groups of remote servers and/or software networks can be a collection of remote computing services. A cloud server can contain algorithms, methods, and databases. Multifunctional writing device data is sent to the cloud server and stored in a database for further processing and can be accessed by the mobile application.

A cloud application is a collection of computer programs and related data designed to perform multifunctional writing device data analysis and evaluation. The data can be audio recording, video recording, examination answers, suspicious behavior alerts, and so on. The cloud application can have algorithms and methods like an auto proctoring method and an auto grading method. It can use machine learning algorithms to improve the accuracy of the methods.

A compass can be a drawing tool used to inscribe circles, arcs, etc. A compass can be a piece of equipment used for drawing circles, consisting of two thin parts joined in the shape of the letter V. A compass can be piece of equipment used for measuring or drawing lines and angles, consisting of two pieces of metal or other materials with pointed ends that are joined together at the top. As dividers, a compass can also be used as a tool to measure distances (e.g., on maps and the like). A compass can be for mathematics, drafting, navigation, and other purposes.

A computing device can be any electronic equipment such as desktop and laptop computers, mobile devices, smartphones, and tablets. Computing device refers to a general-purpose device that can accept software for many purposes in contrast with a dedicated unit of equipment such as a network switch or router. The computing device can connect to multifunctional writing device, send, and receive data, process the inputs and then calculate results from the inputs. The input data can be for example user authentication data, exam answers, and suspicious alerts.

A database is a structured set of data held in a computer, especially one that is accessible in various ways. The software computing environment allows for various operations associated with multifunctional writing device data such as photos, videos, and answers to the exam questions. The data is held in a structured manner in the database.

A digital laser level is a digital way to indicate whether a surface is horizontal (level) or vertical (plumb). A digital laser level is a control tool based on a laser beam projector. The projector projects one or more fixed lines or dots along the horizontal and/or vertical axis, enabling the user using it to align their work to these lines or dots. A digital laser level also projects a beam of light that can be used as a visual chalk line when a straight and level reference point is needed. The size of the beam of light depends on the size of the diode. A smaller beam of light is more precise. A digital laser level application includes leveling and aligning vertical, horizontal, square, angle, grading-slope, and point-transferring applications. Draftsmen, building contractors, masons, and gardeners can use line laser levels for various indoor and outdoor projects. Draftsmen can use a digital laser level along with projected technical drawing images for technical drawings. Indoor applications of laser levels include aligning and plumbing walls, leveling floors, checking door or window heights, installing drop ceilings, installing chair rails and wainscoting in homes, aligning shelves, cabinets, and trim, and using a tripod for easy installation and alignment of cabinets and chair rails. Outdoor applications of laser levels include any type of basic surveys, checking and leveling posts and beams on decks, fences, and porches, masonry alignment, site layout, and easily checking land elevations. Lasers with a slope capability can set grades for proper drainage and irrigation, align fences, posts, and decks, and establish grades, contour farming, or drainage.

A distance sensor is an electronic component that can sense and monitor the distance from the point of origin of a signal to the surface. The intended use of the distance sensor is to measure the distance from the point of origin of the signal to the surface on which image is projected. The image projected on the surface is calibrated to an actual size irrespective of the distance to the surface, providing an accurate unit of measurement.

A digital micromirror device (DMD) is an optical semiconductor (e.g., a micro-opto-electromechanical system (MOEMS)) in a digital light projection (DLP) system. It consists of microscopically small moving mirrors to create a video display An eraser can be soft rubber or plastic, used to remove something written.

A face ID can use a combination of light projectors and sensors to take several images of facial features. The face ID allows biometric authentication. The face ID hardware consists of a sensor with three modules; a dot projector that projects a grid of small infrared dots onto a user's face, a module that shines infrared light at the face, and an infrared camera which takes an infrared picture of the user, reads the resulting pattern, and generates a 3D facial map. This map is compared with the registered face, and the user is authenticated if the two faces match sufficiently.

A grade is to give a mark to a student or a piece of work. This can be done by instructor, administrator, teacher etc. Automatic grading or auto grading is allocating the grade or score to a student using computer algorithms and methods.

A gyroscope can be used for measuring or maintaining the orientation and angular velocity of the multifunctional writing device.

A haptic technology can interface with the user through the sense of touch.

A hinge can be a movable joint or mechanism on which rectangular strips swing as they open or close. A hinge can connect two solid objects.

An imaging system can be a micro camera with a motion tracking sensor on the inside. The imaging system converts written text, hand-drawn doodles, and sketches into a digital format. The camera captures the written information at a frequency of about 250 frames per second, turning it into a digital format. The imaging system converts the examination answers into a digital format for auto grading. The information is stored on the secure digital card of the multifunctional device and can also be transmitted to a mobile device or a cloud server.

Machine learning can be method of data analysis that automates analytical model building. Machine learning is a branch of artificial intelligence that uses statistical techniques to give computer systems the ability to learn from data, without being explicitly programmed. Example machine learning techniques that can be used herein include, inter alia: decision tree learning, association rule learning, artificial neural networks, inductive logic programming, support vector machines, clustering, Bayesian networks, reinforcement learning, representation learning, similarity and metric learning, and/or sparse dictionary learning. Historical user data and sets of other user data that are similar to the user, etc., can be used as training data sets.

A magnet can be piece of iron that has its component atoms so ordered that the material exhibits properties of magnetism, such as attracting other iron-containing ferromagnetic materials such as iron, cobalt, nickel, and gadolinium.

Magnetism can be a physical phenomenon produced by the motion of an electric charge, resulting in attractive and repulsive forces.

A magnetic lock can be a locking system that consists of a permanent magnet object which attaches itself to an object made of ferromagnetic material. Ferromagnetic materials are attracted to permanent magnets because they are full of tinier magnets which align with the field of the larger permanent magnet. A magnetic lock can also consist of two permanent magnet objects with opposite polarities attached to each other. Both of these magnetic lock systems allow the two objects to be attached together and cannot be opened unless some force is applied.

A method can be a particular form of procedure for accomplishing something.

A micro-electromechanical systems (MEMS) device contains tiny integrated devices or systems that combine mechanical and electrical components. They are fabricated using integrated circuit (IC) batch processing techniques and can range in size from a few micrometers to millimeters. MEMS devices combine small mechanical and electronic components on a silicon chip. The fabrication techniques used for creating transistors, interconnects, and other components on an integrated circuit (IC) can also be used to construct mechanical components such as springs, deformable membranes, vibrating structures, valves, gears, and levers. The MEMS components are used for the projector components, hardware components, cameras, and lenses.

A microphone is a device that converts the air pressure variations of a sound wave to an electrical signal. The multifunctional writing device microphone and speaker allow users exam location two-way communication as well as monitoring of sound near the multifunctional writing device.

A mobile device can include a handheld computing device that includes an operating system (OS), and can run various types of application software, known as apps. Example handheld devices can also be equipped with various context sensors such as biosensors, physical environmental sensors, digital cameras, Wi-Fi, Bluetooth, and GPS capabilities. Mobile devices can allow connections to the internet and/or other Bluetooth-capable devices, such as, inter alia: an automobile, a wearable computing system, and/or a microphone headset. Example mobile devices can include smart phones, tablet computers, optical head-mounted displays (OHMD) (e.g., Google Glass®), virtual reality head-mounted displays, smart watches, other wearable computing systems, and so on.

A model can be a system used as an example to follow.

A motion sensor is an electronic component that utilizes a sensor to detect nearby motion. The intended use of the motion sensor is to detect, measure, and monitor motion events surrounding the multifunctional writing device.

A multifunctional drawing tool can consist of multiple drawing tools in a single unit such as a protractor, a ruler, and a set square forty-five-degree (45°) triangle or any other combinations.

A pen can be a writing implement used to apply ink to a surface, such as paper, for writing or drawing. The multifunctional writing device can contain a pen inside the pencil cavity.

A pencil can be a writing implement or art medium constructed of a narrow, solid pigment core inside a protective casing which prevents the core from being broken or leaving marks on the user's hand during use.

A pivot can be pin or shaft on which a mechanism turns or folds.

A proctor a person who monitors students during an examination. The automatic proctoring or auto proctoring requires no person and monitoring of the student is done by mining the recorded exam video for suspicious activities, cheating and other events during an examination using machine learning algorithms and methods.

A projector pen and a projector stick are optical devices that project an image or video onto a surface.

A protractor can be an instrument for measuring angles. A protractor can measure angles in degrees (°). A radian-scale protractor measures angles in radians. A protractor can be divided into one-hundred and eighty (180) equal parts.

A sensor can be a module or electronic component or device that receives a stimulus or input such as quantity, property, or condition, and responds with an electrical signal. It acquires a physical quantity, property, or condition and converts it into a signal suitable for processing (e.g., optical, electrical, mechanical). The intended use of the sensor is to detect and respond to some type of stimulus or input from the physical environment or motion.

A set square can be an object used in engineering and technical drawing, with the aim of providing a straightedge at a right angle or other particular planar angle to a baseline. As an example, a set square can be a forty-five-degree (45°) triangle or a set square thirty/sixty-degree (30/60°) triangle object.

A single board microcomputer is a complete computer built on a single board with central processing unit, memory, secure digital card, gyroscope, microphone, speaker, general purpose input/output, USB ports, camera ports, power supply unit, and other features required of a functional computer. Multifunctional writing device sensors are either built in or connected to a single board microcomputer using general purpose input/output pins. A single board microcomputer contains embedded software to operate it independently.

A speaker is a transducer that converts electromagnetic waves into sound waves. The multifunctional writing device microphone and speaker allow a person two-way communication with the person on the mobile device through the mobile application.

A ruler can be a straight, rectangular device typically marked at regular intervals, used to draw straight lines or measure distances in customary or metric units.

A stylus can be a writing utensil and/or a small tool for some other form of marking or shaping. A stylus can be a small, pen-shaped instrument that is used to input commands to a computer screen, mobile device, or graphics tablet. With touch screen devices, a user can place a stylus on the surface of the screen to draw or make selections by tapping the stylus on the screen. A stylus tip can also be a nib.

A technical drawing tool can be a protractor, a ruler, a set square thirty/sixty-degree (30/60°) triangle, a set square forty-five-degree (45°) triangle, or a compass needle. A technical drawing tool can be used for measurements and layouts of drawings.

A touch ID is an electronic fingerprint recognition feature that allows users to unlock devices. The touch ID allows biometric authentication. It is used to authenticate the identity of a person. The sensor uses capacitive touch to detect the user's fingerprint. A highly scratch-resistant sapphire glass lens protects the assembly and focuses the sensor, while a steel ring surrounds it, waiting to detect the finger. When that is triggered, the capacitive touch ID sensor activates and takes a high-resolution snapshot of the fingerprint.

Universal Serial Bus (USB) is an industry standard that defines cables, connectors, and communications protocols for connection, communication, and power supply between computers and devices. The USB can be used to power and program the multifunctional writing device.

Wi-Fi is a family of wireless networking technologies allowing computers, smartphones, or other devices to connect to the internet or communicate with one another wirelessly within a particular area. The mobile application allows users to access the multifunctional writing device data through Wi-Fi.

A wireless power transfer (WPT) is the transmission of electrical energy without wires. Wireless power transmission technologies can use time-varying electric, magnetic, or electromagnetic fields. Wireless power transfer can be used to charge the multifunctional writing device.

Exemplary Systems and Methods

FIGS. 1-24 illustrate various views and functions of the multifunctional writing device 100, according to some embodiments.

A multifunctional writing device 100 comprises:

A hollow body, wherein the hollow body comprises one or more cavities configured to store a mechanical pencil 112, a multifunctional drawing tool 114, a compass needle 116, a stylus 118, an eraser 120, a USB flash drive 122, an imaging system 142, a projector pen 152, a set of cameras 158-164, and attaches a projector stick 154.

A first writing member comprising a first writing tip, wherein the first writing member comprises a lead, and a mechanical pencil 112 system being provided in a first portion of the hollow body 110, a touch ID sensitive barrel 124, and wherein the first writing tip is axial with respect to the hollow body.

A second projector member comprising a second projector pen 152, wherein the second projector member comprises a projector pen system being provided in the second portion of the hollow body 150, and wherein the second projector pen 152 is axial with respect to the hollow body, and wherein the first portion of the hollow body 110 is at the opposite end of the second portion of the hollow body 150.

A compass needle push button 126 is used to remove a compass needle 116 from the compass needle cavity 296.

A mechanical pencil push button 128 to feed out more lead whenever needed and retracting the lead by holding the mechanical pencil push button 128 in and gently pushing the lead in. A mechanical pen can also be used instead of a mechanical pencil 112.

A projector power push button 166 which allows power on or off a projector pen 152, and a projector stick 154.

A pivot pin 450 system which allows opening or closing of a multifunctional drawing tool 114, a compass needle 116, and a projector stick 154.

A magnetic lock 420 which attaches and stores a multifunctional drawing tool 114 and a compass needle 116 inside a cavity, wherein a magnetic lock 420 is formed when a permanent magnet object attaches itself to an object made of ferromagnetic material.

A magnetic lock 440 which attaches a multifunctional drawing tool 114 around two pivot pins 905, 906 and top edges of rectangular strips 901, 902 in an open position, wherein a magnetic lock 440 is formed when two permanent objects with opposite polarities attach to each other.

FIGS. 10-23 show that the multifunctional writing device 100 projector pen 152 and projector stick 154 can also project an image onto a surface 1004. The projected image can be any technical drawing tool such as a ruler 130, a protractor 132, a set square forty-five-degree (45°) triangle 134, a set square thirty/sixty-degree (30/60°) triangle 136, and a light dot 140. The multifunctional writing device 100 can be programmed to display other drawing tools such as a measuring tape, geometric drawing template, T-square, ellipsograph, and so on.

The projector pen 152 in a power on state can only project images onto a surface 1004 when the projector stick 154 is on top of the second portion of the hollow body 150.

The projector stick 154 in a power on state can only project images onto a surface 1004 when the projector stick 154 is in open position and perpendicular to the second portion of the hollow body 150. In this case, the projector pen system light, digital laser level, and distance sensor signals are diverted to the projector stick 154.

FIG. 1 illustrates the front elevation view of a multifunctional writing device 100 with a mechanical pencil 112, a multifunctional drawing tool 114, a compass needle 116, an imaging system 142, a projector pen 152, and a projector stick 154, according to some embodiments.

The multifunctional writing device 100 comprises a hollow body which consists of a first portion of the hollow body 110, and a second portion of the hollow body 150.

The first portion of the hollow body 110 comprises a mechanical pencil 112, a multifunctional drawing tool 114, a compass needle 116, a stylus 118, an eraser 120, a USB flash drive 122, a touch ID sensitive barrel 124, a compass needle push button 126, a mechanical pencil push button 128, and an imaging system 142.

The second portion of the hollow body 150 comprises a projector pen 152, a projector stick 154, a projector stick lens 156, a camera1 158, a camera1 160, a camera3 162, a camera4 164, and a projector power push button 166.

Figure 2:
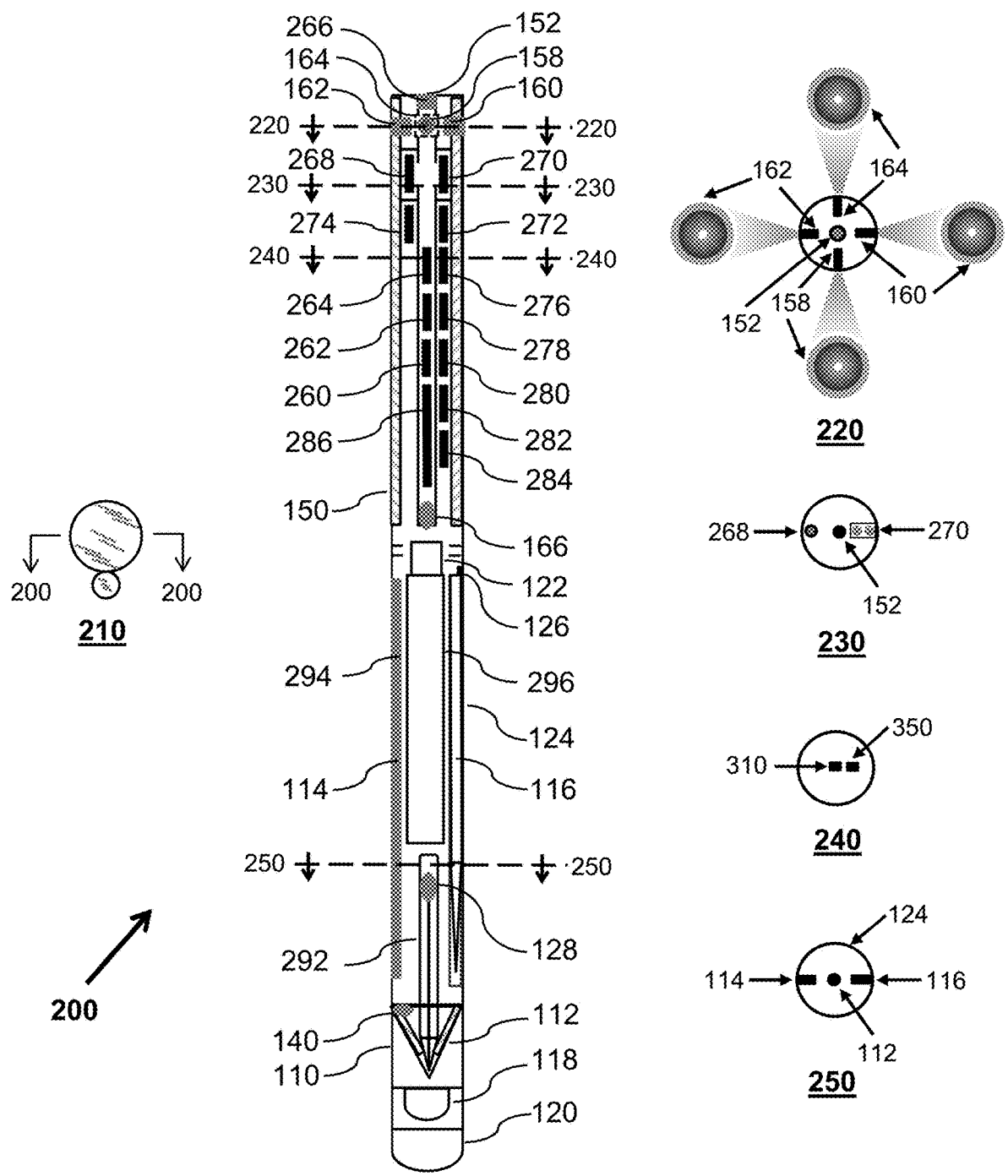
FIG. 2 illustrates a front elevation view of a multifunctional writing device with parts in the collapsed position, and the front face removed, cross-sectional views of a set of cameras, a set of projector components, a set of hardware components, a mechanical pencil cavity, a multifunctional drawing tool cavity, and a compass needle cavity, according to some embodiments.

FIG. 2 illustrates the front elevation view 200 of a multifunctional writing device 100 with parts in the collapsed position, and the front face removed, cross sectional views of a set of cameras 158-164, a set of projector components 310, a set of hardware components 350, a mechanical pencil cavity 292, a multifunctional drawing tool cavity 294, and a compass needle cavity 296, according to some embodiments.

The front elevation view 200 is taken along a line 200-200 of the top plan view 210 of the multifunctional writing device 100.

The set of projector components 310 includes an element 260 comprising a red LED, a green LED, a blue LED, and dichroic filters; an element 262 comprising a collection optics condenser and light pipe; an element 264 comprising an imager, relay lens, prism, and digital micromirror device (DMD); and a projection optics lens 266. The location of the projector components is at the center of the first portion of the hollow body 150 to project a light source onto the surface.

The set of hardware components includes a digital laser level 268, a distance sensor 270, a camera circuit 272, a microphone 274, a touch ID sensor circuit 276, a GPS sensor 278, an accelerometer 280, a motion sensor 282, an element 284 comprising a Bluetooth, a Wi-Fi, and a cellular, and a single board microcomputer 286.

The projector components 310 and hardware components 350 are powered on by clicking the projector power push button 166. The imaging system 142, a projector pen 152, a set of cameras 158-164, a projector stick 154, a digital laser level 268, a distance sensor 270, a microphone 274, and so on, can be powered on and off using voice commands.

The digital laser level 268 and a distance sensor 270 are located opposite each other. The digital laser level 268 is a digital way to indicate whether a surface is horizontal (level) or vertical (plumb). The technical drawing tool image projected on the surface is auto leveled using a digital laser level 268. The distance sensor 270 calibrates the projected technical drawing tool image on a surface to an actual size irrespective of a distance to the surface. The projected technical drawing tool images display the actual size of the unit such as centimeter, inch, degree, and so on.

The cross-sectional view 220 taken along line 220-220 shows the layout of the set of cameras 158-164 allowing 360-degree video recording of the surroundings. The 360-degree video recording allows panoramic surveillance and immediately addresses any red flags or suspicious behavior or suspicious activities during auto video proctoring when a student is taking an exam.

The multifunctional writing device 100 comprises a set of cameras 158-164 which is attached and stored in a camera cavity in the second portion of the hollow body 150.

The multifunctional writing device 100 projector stick 154 is magnetically attached to the second portion of the hollow body 150 and revolves around a pivot pin to open or close.

The multifunctional writing device 100 projector stick 154 is axial with respect to the second portion of the hollow body 150.

The cross-sectional view 230 taken along line 230-230 shows the layout of a digital laser level 268 and a distance sensor 270.

The cross-sectional view 240 taken along line 240-240 shows the layout of some of the projector components 310 and hardware components 350.

The cross-sectional view 250 taken along line 250-250 shows the layout of a mechanical pencil 112, a multifunctional drawing tool 114, and a compass needle 116.

The multifunctional writing device 100 multifunctional drawing tool 114 is magnetically attached by a magnetic lock 420 and stored in a multifunctional drawing tool cavity 294 in the first portion of the hollow body 110.

The multifunctional writing device 100 compass needle 116 is attached by a magnetic lock 420 and stored in a compass needle cavity 296 and runs on the opposite side of the multifunctional drawing tool cavity 294 in the first portion of the hollow body.

Figure 3:
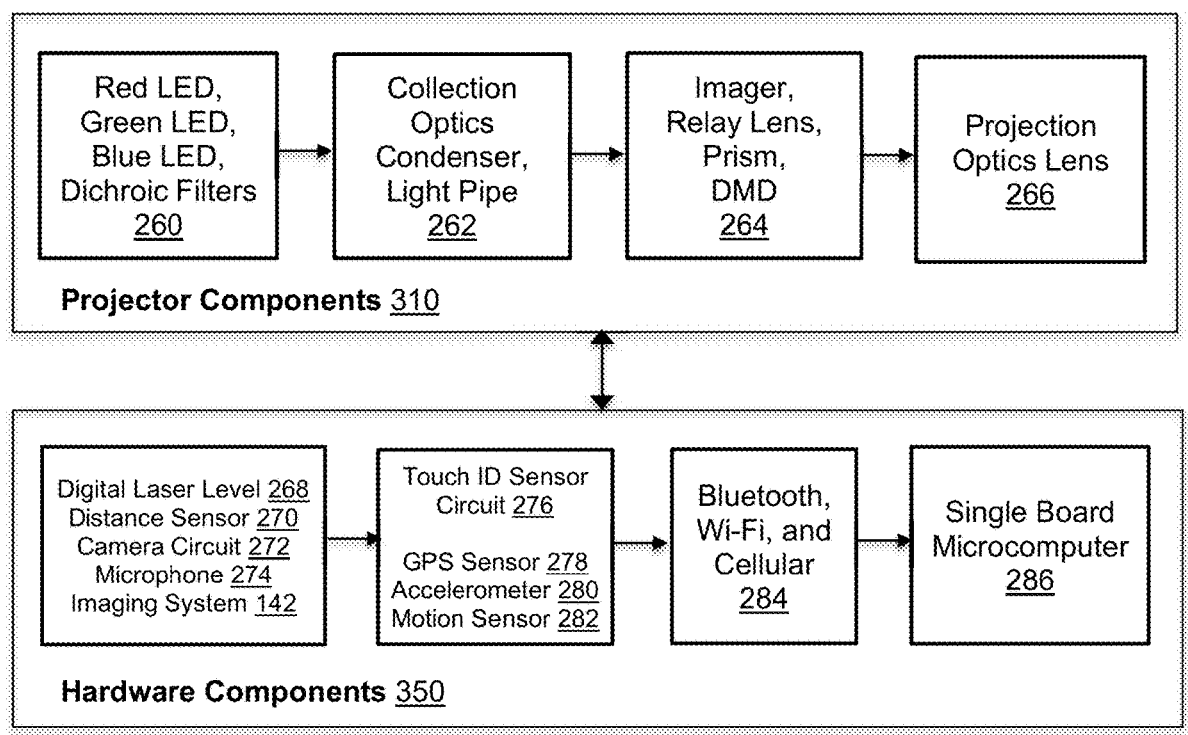
FIG. 3 is a diagram of an example multifunctional writing device comprising a set of projector components and a set of hardware components arrangement that can be utilized to implement various embodiments.

FIG. 3 is a diagram of an example multifunctional writing device 100 comprising a set of projector components 310 and a set of hardware components 350 arrangement that can be utilized to implement various embodiments.

The set of projector components 310 includes an element 260 comprising a red LED, a green LED, a blue LED, and dichroic filters; an element 262 comprising a collection optics condenser and light pipe; an element 264 comprising an imager, relay lens, prism, and digital micromirror device (DMD); and a projection optics lens 266.

The set of hardware components is a digital laser level 268, a distance sensor 270, a camera circuit 272, a microphone 274, an imaging system 142, a touch ID sensor circuit 276, a GPS sensor 278, an accelerometer 280, a motion sensor 282, an element 284 comprising a Bluetooth, a Wi-Fi, and a cellular, and a single board microcomputer 286.

FIG. 3 depicts an example computing system that can be configured to perform any one of the processes provided herein. In this context, the computing system may include, for example, LED projector components, a processor, memory, storage, and I/O devices. However, the computing system may include circuitry or other specialized hardware for carrying out some or all aspects of the processes. In some operational settings, the computing system may be configured as a system that includes one or more units, each of which is configured to carry out some aspects of the processes either in software, hardware, or some combination thereof.

FIG. 3 also depicts the computing system with a number of components that may be used to perform any of the processes described herein. The system consists of projector components 310 and hardware components 350.

The projector components 310 include an element 260 comprising a red LED, a green LED, a blue LED, and dichroic filters; an element 262 comprising a collection optic condenser and light pipe which direct the light from the LED to an element 264 comprising an imager, relay lens, prism, and digital micromirror device (DMD) which accepts digital display signals to shutter the LED light and direct it to the projection optics, and a projection optics lens 266 to project the display image on the surface or screen and permit functions such as, inter alia: focusing of the image. The projector component circuitry is used to project the technical drawing tools images onto any surface.

The hardware system 350 includes a digital laser level 268 which combines to indicate whether a surface is horizontal (level) or vertical (plumb). This is used to ensure that projected drawing tools images displayed on the surface are parallel or vertical to the reference lines like lines on ruled paper, graph paper, walls, fences, etc. The distance sensor 270 ensures that projected technical drawing tools images are calibrated to their actual size measurement irrespective of the distance to the surface on which they are projected. This way the tick marks, angles, and radians are accurately displayed for a given technical drawing tool. Conventional projector lack intelligence of multifunctional writing device 100 and display images which are zoomed in or out (too big or small) based on where the projector is located. The camera circuit 272 controls four cameras. The microphone 274 can be used for either two-way communication or as noise detector. The GPS sensor 278 provides the location of the multifunctional writing device 100. The intended use of the accelerometer 280 sensor is to measure the movement of the multifunctional writing device 100. If there is no movement, it can put the multifunctional device into a sleep state to conserve power. The intended use of the motion sensor 282 is to detect, measure, and monitor motion events surrounding the multifunctional writing device 100. The element 284 comprising a Bluetooth, a Wi-Fi, and a cellular allows connection of the multifunctional writing device 100 to the internet and mobile devices. A single board microcomputer 286 is a complete computer built on a single board with a central processing unit, memory, secure digital card, gyroscope, microphone, speaker, general purpose input/output, USB ports, camera ports, power supply unit, and other features required of a functional computer. The multifunctional writing device 100 sensors are either built in or connected to a single board microcomputer 286 using general purpose input/output pins. The single board microcomputer 286 contains embedded software to operate it independently. The embedded software contains computing software to operate and control touch ID, face ID, audio recording, video recording, powering on/off of the projector pen 152 and projector stick 156, digital laser level 268, distance sensor 270, microphone 274, GPS sensor 278, accelerometer 280, gyroscope, and motion sensor 284. The embedded software has computational methods for digitizing the written data on paper, auto proctoring, and auto grading of examinations. The audio recording and video recording data is stored in the secure digital card.

Figure 4:
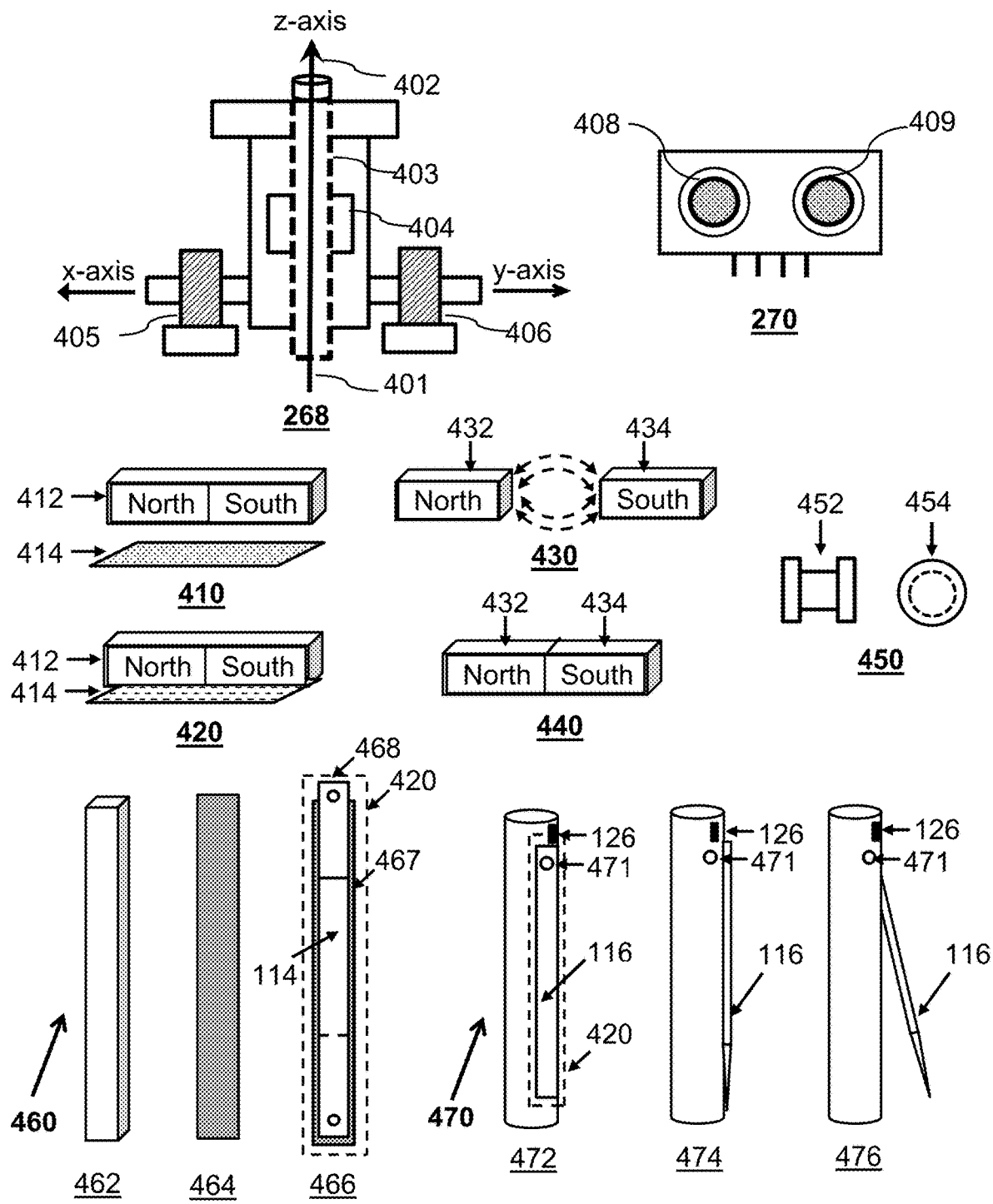
FIG. 4 illustrates items like a schematic view of a digital laser level and a distance sensor, magnetic lock systems, a pivot pin, an example steps to store and access the multifunctional drawing tool, and an example front view of a multifunctional writing device showing steps to open and close a compass needle, according to some embodiments.

FIG. 4 illustrates items like a schematic view of a digital laser level 268 and a distance sensor 270, magnetic lock systems 410-440, a pivot pin 450, element 460 showing example steps to store and access the multifunctional drawing tool 114 inside a multifunctional drawing tool cavity 294, and an example front view element 470 of a multifunctional writing device 100 showing steps to open and close a compass needle 116, according to some embodiments.

A digital laser level 268 is a self-leveling laser. The self-leveling laser can be wire suspended compensators, a pendulum mechanism using a gimbal, or electronic self-leveling. The electronic self-leveling laser levelers are more accurate, and their principles of operation are like the pendulum, except the pendulum is not free-floating. The pendulum has an electronic sensor 404 mounted on it and motor1 405 and motor2 406 to move the pendulum to the position that the electronic sensor 404 provides. The electronic sensor 404 sends the instructions to motor1 405 and motor2 406 to move in the x-axis and y-axis directions for horizontal leveling because there are two axes for horizontal leveling. The vertical leveling is achieved through the z-axis. The sensors are often a simple spirit vial with a laser light source 401 on one side of the laser beam cylinder 403 and a light detector 402 on the other side of the laser beam cylinder 403. When the bubble is centered, the maximum amount of light is allowed through to the sensor. This indicates that that sensor is level and sends instructions to the motor to stop adjusting. The axes are at 90 degrees to each other and are normally referred to as the x-axis and y-axis.

A distance sensor 270 is an electronic component that can sense and monitor the distance from the point of origin of a signal to the surface. The image projected on the surface is calibrated to an actual size irrespective of the distance to the surface. A distance sensor 270 measures the distance from the point of origin of the signal to the surface of the object. The transmitter 408 sends an original signal at a specific frequency, and the receiver 409 is listening for the reflected signal to bounce back from the surface of the object. The object can be any surface. By recording the elapsed time between the signal being generated and the signal wave bouncing back, the distance traveled between the sensor and the surface is calculated. The projected technical drawing tool is calibrated to the actual size irrespective of the distance to the surface, resulting in a true display of technical drawing tool units such as centimeter, inches, degrees, and so on.

A magnetic lock 420 can be a locking mechanism that consists of a permanent magnet object 412 and a ferromagnetic material object 414. Element 410 illustrates that the ferromagnetic material object 414 is attracted to the permanent magnet because they are full of tinier magnets which align with the field of the larger permanent magnet object 412. The permanent magnet object 412 attaches to a ferromagnetic material object 414 when they are very close.

A magnetic lock 440 can be a locking mechanism that consists of two permanent magnetized edges, north pole 432 and south pole 434, with opposite polarity. As shown in element 430, the permanent magnet has a distinct north and south magnetic pole. The north pole 432 of one magnet is attracted toward the south pole 434 of another magnet. This magnetic principle is used to create a magnetic lock between two rectangular strips or plates with opposite polarity near the pivot pin or hinge of the technical drawing tools when they are in the open position.

The pivot pin 450 mechanism consisting of short metal pins or bolts is used to hold two rectangular strips of a technical drawing tool together. The pivot pin 450 illustrates the pivot pin front view 452 and pivot pin side view 454.

Element 460 illustrates the storage and removal of the multifunctional drawing tool 114.

Element 462 is an isometric view of a multifunctional drawing tool cavity 294 inside which a multifunctional drawing tool 114 can be stored or retained. Element 464 illustrates an empty cross-sectional view of a multifunctional drawing tool cavity 294. Element 466 shows a multifunctional drawing tool 114 stored inside a multifunctional drawing tool cavity 294.

The multifunctional drawing tool cavity 294 is made of ferromagnetic material such as iron, cobalt, nickel, and gadolinium. This allows the multifunctional drawing tool 114 and a compass needle 116 with permanent magnet properties to be stored and magnetically locked or retained in a place inside cavities of the first portion of the hollow body 110. The magnetic lock 420 ensures that the stored multifunctional drawing tool 114 and a compass needle 116 do not move inside the cavity during the use of the multifunctional writing device 100 components such as a stylus 118, an eraser 120, a USB flash drive 122, an imaging system 142, a projector pen 152, and a projector stick 154.

Element 466 shows a multifunctional drawing tool 114 in a closed position magnetically attached and stored in a multifunctional drawing tool cavity 467 in the first portion of the hollow body 110. The magnetic lock 420 attaches the multifunctional drawing tool 114 inside the multifunctional drawing tool cavity 467.

After removing the eraser 120 and stylus 118 cap, the multifunctional drawing tool 114 can be removed from the multifunctional drawing tool cavity 467 of the first portion of the hollow body 110 by pulling the rectangular strip top portion 468 as illustrated in element 466.

The multifunctional writing device 100 multifunctional drawing tool 114 is removed from a multifunctional drawing tool cavity 467 by pulling rectangular strip top portion 468.

Element 470 illustrates the opening of a compass needle 116 method. The principle of operation is like a handheld divider which can be opened around a pivot pin 471.

Element 472 shows a compass needle 116 attached and stored in a compass needle cavity 296 in the first portion of the hollow body 110. A magnetic lock 420 mechanism attaches the compass needle 116 to the compass needle cavity 296 in the first portion of the hollow body 110.

The multifunctional writing device 100 compass needle 116 revolves around a pivot pin 471 to open or close.

The steps to open a compass needle 116 are as follows:

1. Press the compass needle push button 126 to release the compass needle 116 as shown in element 474.

2. Pull the compass needle 116 by grasping with fingers and pulling the needle portion outward from multifunctional writing device 100 as shown in element 476.

3. The compass needle 116 is held to any open position by the screw on the hinge which attaches the compass needle 116 in its position. The hinge stiffness around the pivot pin 471 ensures that the compass needle 116 remains open at the desired arc length during use as shown in element 476.

The compass needle 116 can be stored inside the compass needle cavity 296 by simply pushing it toward the first portion of the hollow body 110.

The compass needle 116 is attached by a magnetic lock 420 and stored in a compass needle cavity 296 in the first portion of the hollow body 110.

Figure 5:
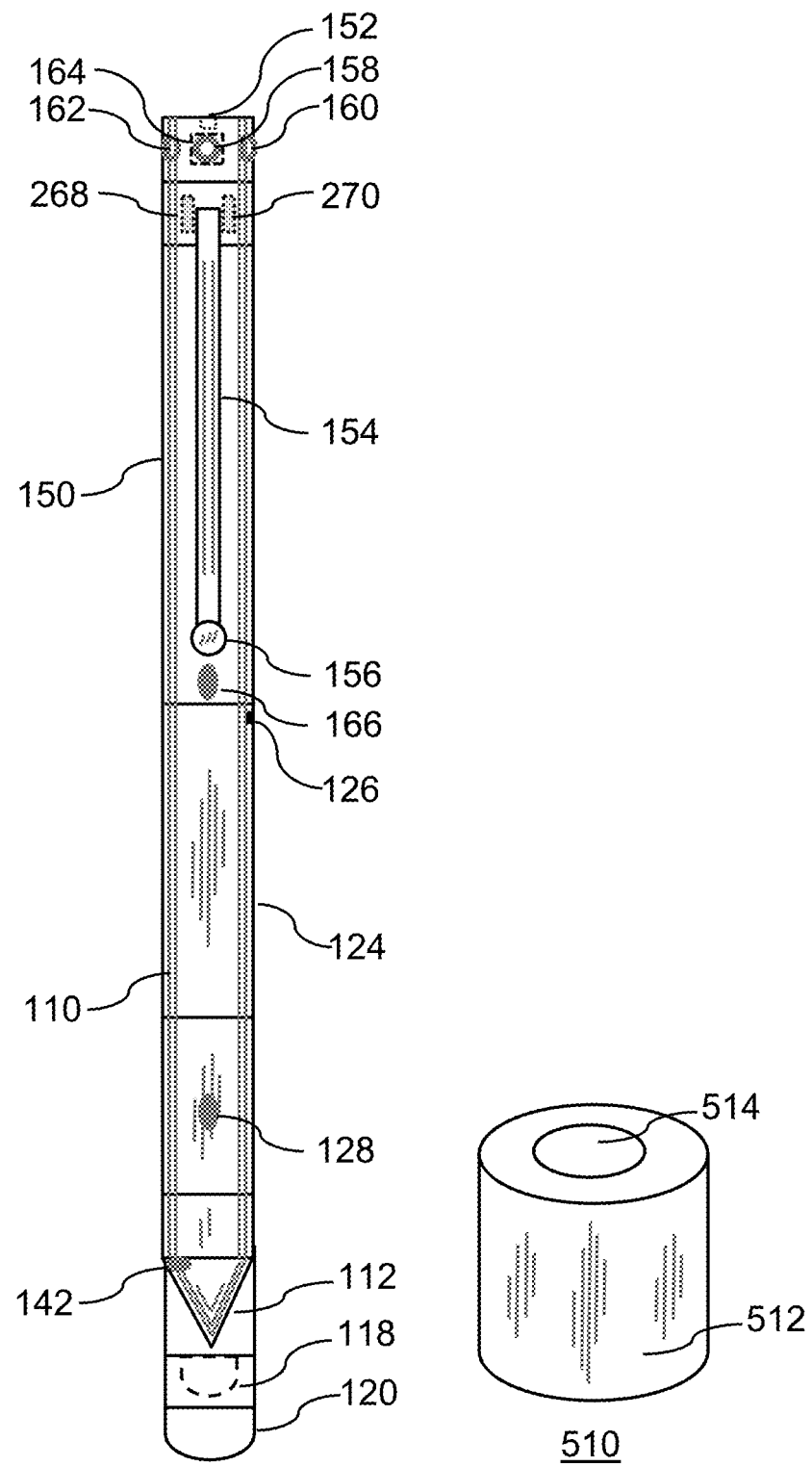
FIG. 5 illustrates a front elevation view of a multifunctional writing device with a multifunctional drawing tool, a compass needle, and a projector stick in the retracted position, according to some embodiments.

FIG. 5 illustrates the front elevation view of a multifunctional writing device 100 with a multifunctional drawing tool 114, a compass needle 116, and a projector stick 154 in the retracted position, according to some embodiments.

The first portion of the hollow body 110 comprises a mechanical pencil 112, a stylus 118, an eraser 120, a USB flash drive 122, a touch ID sensitive barrel 124, an imaging system 142, a compass needle push button 126, and a mechanical pencil push button 128.

The second portion of the hollow body 150 comprises a projector pen 152, a projector stick 154, a projector stick lens 156, a camera1 158, a camera1 160, a camera3 162, a camera4 164, a projector power push button 166, a digital laser level 268, and a distance sensor 270.

The base stand 510 can be used to hold the multifunctional drawing tool 100 during use. The base stand 510 consists of a cylindrical body 512 to hold multifunctional writing device 100 inside a holding cavity 514. The base stand 510 allows hands free use of projector stick 154 for drawing on top of a paper or flat surface. The base stand 510 also allows for hands free use of projector pen 152 to project image on ceilings, walls, and so on.

Figure 6:
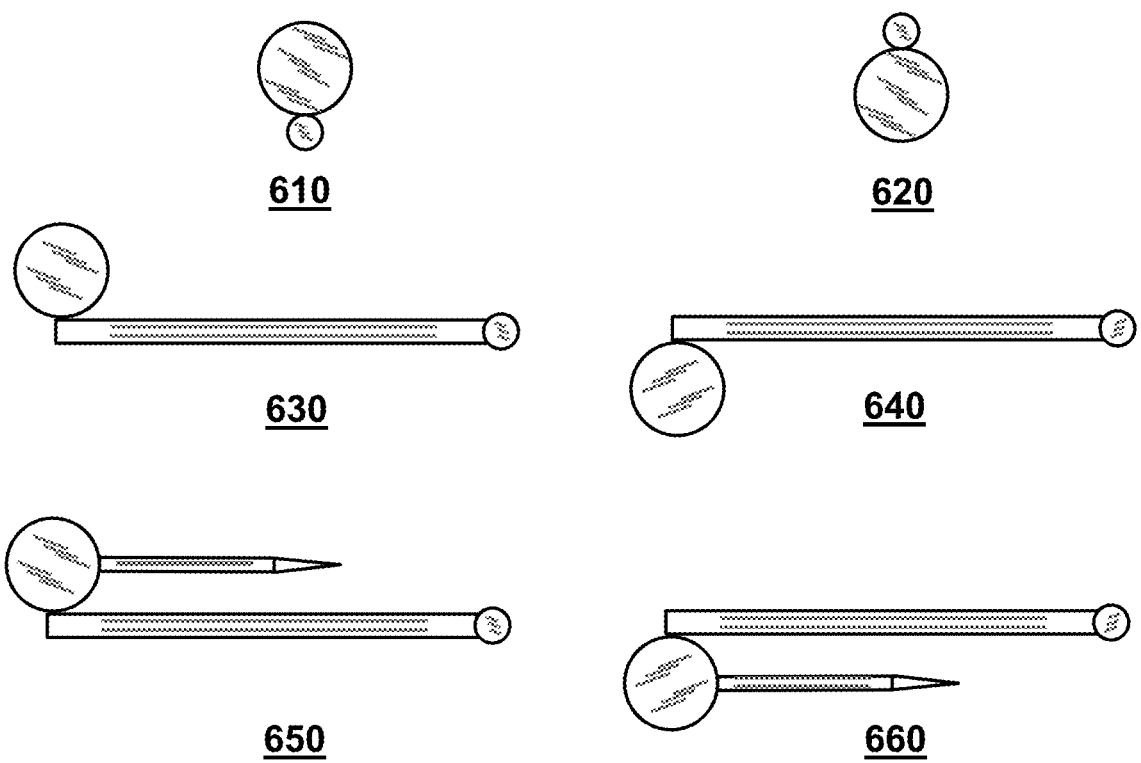
FIG. 6 illustrates a top plan view and a bottom plan view of a multifunctional writing device with parts in a retracted position; a top plan view and a bottom plan view of a multifunctional writing device with a compass needle in a retracted position and a projector stick in the extended position; and a top plan vie, and a bottom plan view of a multifunctional writing device with a compass needle and a projector stick in the extended position, according to some embodiments.

FIG. 6 illustrates a top plan view and a bottom plan view of a multifunctional writing device 100 with parts in the retracted position; a top plan view and a bottom plan view of a multifunctional writing device 100 with a compass needle 116 in the retracted position, and a projector stick 154 in the extended position; a top plan view and a bottom plan view of a multifunctional writing device 100 with a compass needle 116 and a projector stick 154 in the extended position, according to some embodiments.

FIG. 6 illustrates following views:

A top plan view1 610 with parts in retracted position, a bottom plan view1 620 with parts in the retracted position, A top plan view2 630 with a compass needle 116 in the retracted position, and a projector stick 154 in the extended position, a bottom plan view2 640 with a compass needle 116 in the retracted position, and a projector stick 154 in the extended position.

A top plan view3 650 with a compass needle 116 and a projector stick 154 in the extended position, a bottom plan view3 660 with a compass needle 116 and a projector stick 154 in the extended position.

Figure 7:
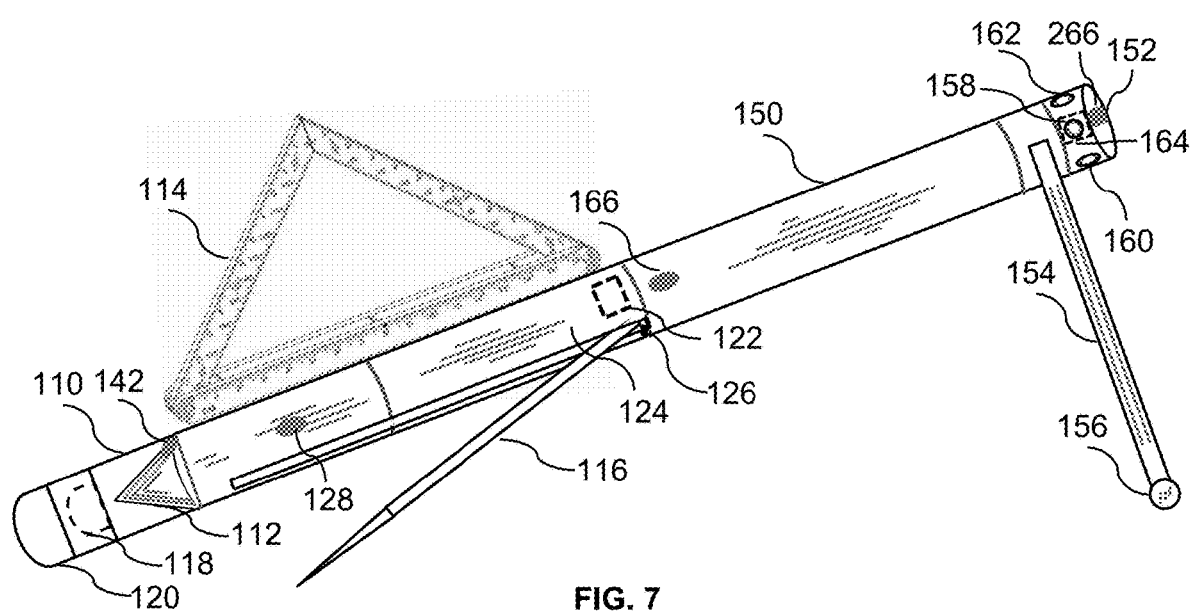
FIG. 7 illustrates a perspective view of a multifunctional writing device with a multifunctional drawing tool, a compass needle, and a projector stick in the extended position, according to some embodiments.

FIG. 7 illustrates a perspective view of a multifunctional writing device 100 with a multifunctional drawing tool 114, a compass needle 116, and a projector stick 154 in the extended position, according to some embodiments.

The multifunctional writing device 100 comprises a hollow body which consists of a first portion of the hollow body 110, and a second portion of the hollow body 150.

The first portion of the hollow body 110 comprises a mechanical pencil 112, a multifunctional drawing tool 114, a compass needle 116, a stylus 118, an eraser 120, a USB flash drive 122, a touch ID sensitive barrel 124, a compass needle push button 126, a mechanical pencil push button 128, and an imaging system 142.

The second portion of hollow body 150 comprises a projector pen 152, a projector stick 154, a projector stick lens 156, a camera1 158, a camera1 160, a camera3 162, a camera4 164, and a projector power push button 166.

Figure 8:
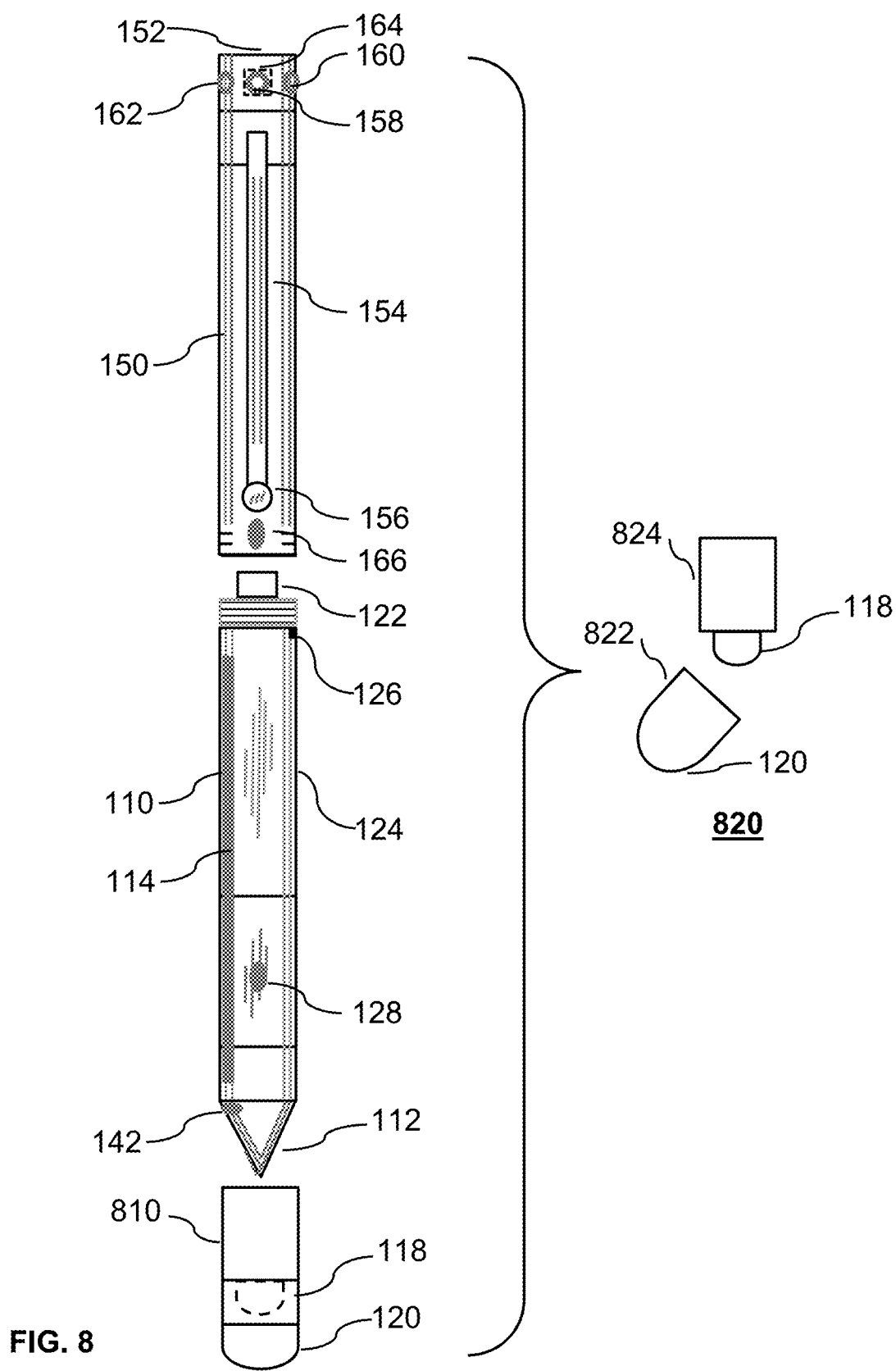
FIG. 8 illustrates an exploded view of a multifunctional writing device with parts in the collapsed position, according to some embodiments.

FIG. 8 illustrates an exploded view of a multifunctional writing device 100 with parts in the collapsed position, according to some embodiments. The exploded view comprises a first portion of the hollow body 110, and a second portion of the hollow body 150. The first portion of the hollow body 110 can be further separated into a third portion element 810. The mechanical pencil 112 can be accessed after removing the third portion element 810 by twisting it to the left.

The multifunctional writing device 100 tip of the first portion of the hollow body 110 comprises an eraser cap 822 over a tip of the mechanical pencil system.

The multifunctional writing device 100 eraser cap 822 comprises a stylus 118. The stylus 118 is part of a stylus cap 824.

The multifunctional writing device 100 USB flash drive 122 is stored in the first portion of the hollow body 110.

The multifunctional writing device 100 imaging system 142 is stored in the first portion of the hollow body and is used to digitize written data on paper.

The multifunctional drawing tool 114 can be accessed and pulled out of the multifunctional tool cavity 294 after removing the third portion element 810.

A stylus 118 can be accessed by twisting the eraser cap 822 to the left.

Figure 9:
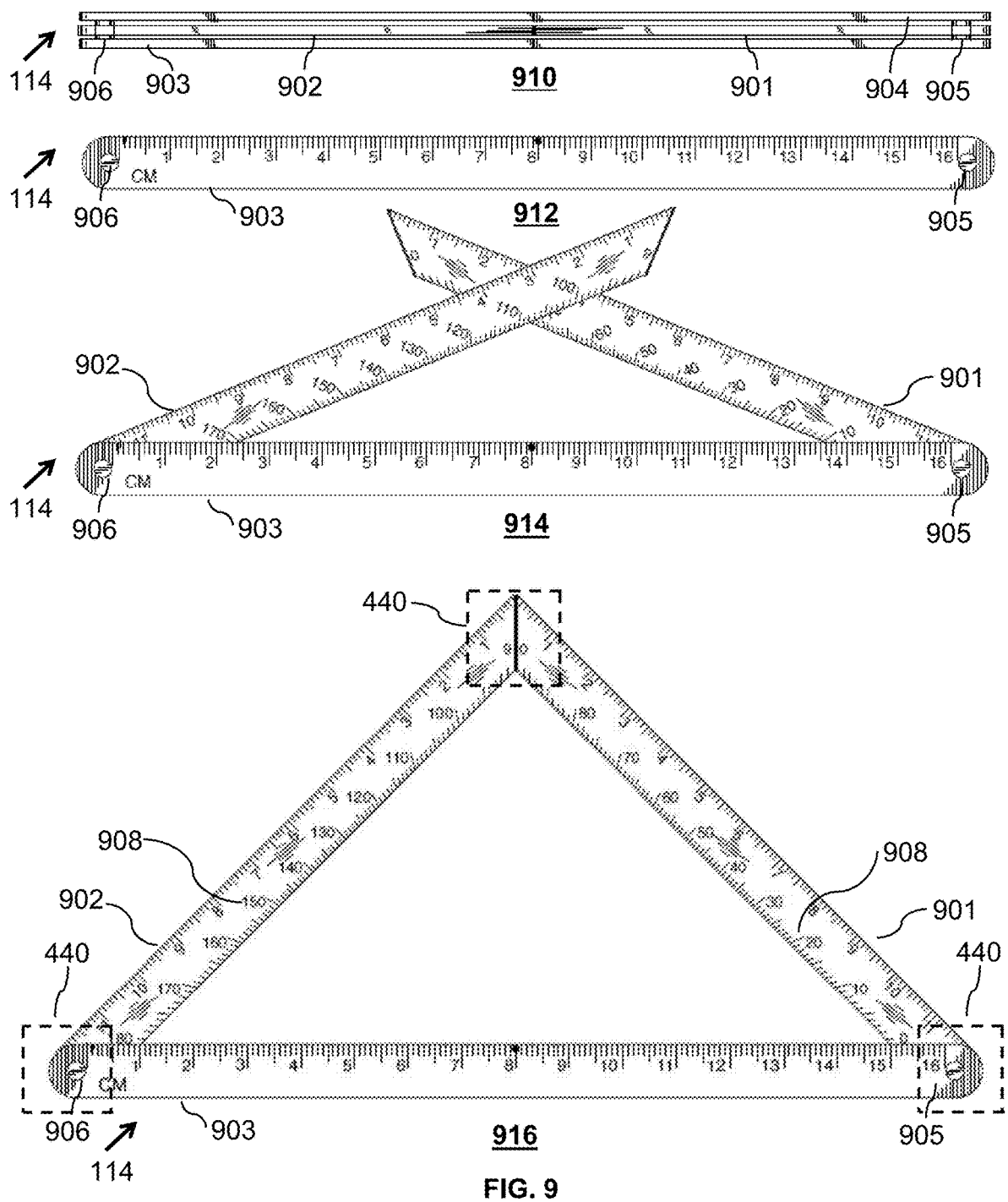
FIG. 9 illustrates an example top plan view and front elevation view of a multifunctional drawing tool, showing steps to open and close a multifunctional drawing tool, according to some embodiments.

FIG. 9 illustrates an example top plan view 910 and front elevation view element 912-916 of a multifunctional drawing tool, showing steps to open and close a multifunctional drawing tool 114, according to some embodiments.

The principle of operation to open a multifunctional drawing tool 114 is like that of opening rectangular strips, which can be opened or closed around two pivots.

The components of the multifunctional drawing tool 114 are shown in the top plan view 910. They consist of rectangular strips 901, 902, 903, and 904 and pivot pins 905 and 906. The rectangular strips 903 and 904 are fixed. In a fully open position, the rectangular strips form a multifunctional drawing tool 114 with the aim of providing a straight edge at a right angle or other planar angles to a baseline. The multifunctional drawing tool can be used as a ruler, a protractor, and a set square forty-five-degree (45°) triangle.

The multifunctional drawing tool's 114 two rectangular strips 901 and 902 revolve around two pivot pins 905 and 906 to open or close.

The steps to open a multifunctional drawing tool 114 are as follows:

1. First remove the third portion element 810 from the multifunctional device 100 by slightly twisting it to the left.
2. Pull the multifunctional drawing tool 114 by grasping the accessible rectangular strip top portion 468 with fingers, from the multifunctional device 100.

The top plan view 910 of the multifunctional drawing tool 114 shows rectangular strips 901, 902, 903, and 904 and pivot pins 905 and 906. The rectangular strips 903 and 904 are fixed and act as a ruler in the completely closed position. The ruler units are engraved on both the sides of rectangular strips 903 and 904.

3. Hold the multifunctional drawing tool 114 in the front elevation view element 912 position.
4. The multifunctional drawing tool's 114 first rectangular strip 901 can be opened by being rotated toward the right position around the pivot pin 905, and the second rectangular strip 902 can be opened by being rotated toward the left position around the pivot pin 906, as shown in front elevation view elements 914 and 916.
5. In a fully open position, the multifunctional drawing tool 114 is in triangle form as shown in the front elevation view element 916.

A multifunctional drawing tool 114 is attached in an open position by a magnetic lock 440 around two pivot pins 905 and 906 and the top edges. A magnetic lock 440 mechanism attaches the multifunctional drawing tool 114 right side by the first rectangular strip 901 and rectangular strips 903 and 904 around the pivot pin 905 in the open position. Similarly, a magnetic lock 440 attaches the left side second rectangular strip 902 and rectangular strips 903 and 904 around the pivot pin 906 in the open position. The magnetic lock 440 also attaches the first rectangular strip 901 and second rectangular strip 902 around the top edges in the open position.

The multifunctional drawing tool 114 is attached in an open position by a magnetic lock 440 around two pivot pins 905 and 906 and the top edges of rectangular strips 901 and 902.

The rectangular strips 903 and 904 act as a ruler. The rectangular strips 901 and 902 are part of a set square forty-five-degree (45°) triangle. The rectangular strips 901 and 902 have protractor measuring angles 908. A protractor can be an instrument for measuring angles. A protractor can measure angles in degrees (°). A radian-scale protractor measures angles in radians. A protractor can be divided into one-hundred and eighty (180) equal parts.

The multifunctional drawing tool 114 can be closed by following steps 3, 4, and 5 in reverse order and then inserting and storing it in the multifunctional drawing tool cavity 294 in the first portion of the hollow body 110.

Figure 10:
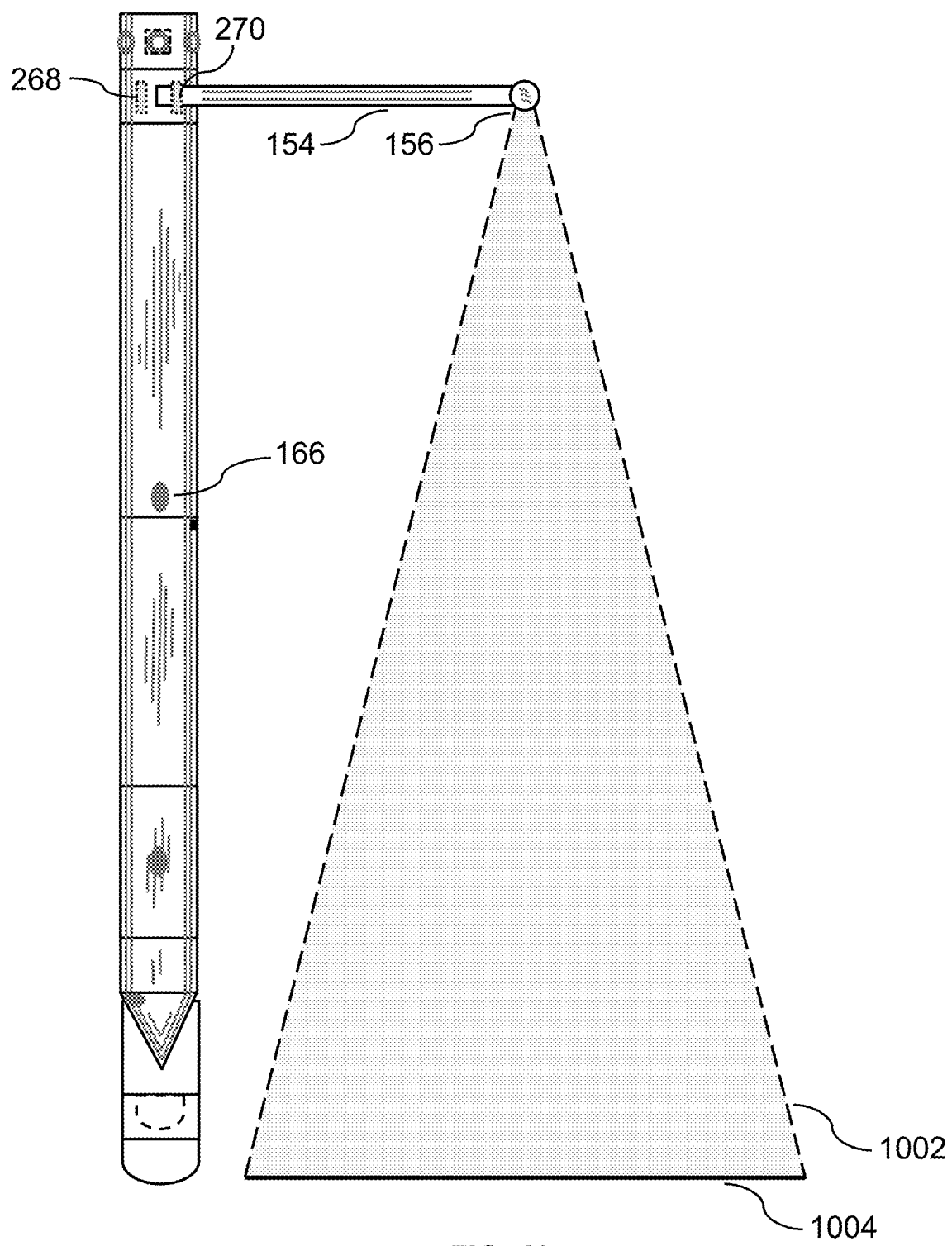
FIG. 10 illustrates a front elevation view of a multifunctional writing device with a projector stick light source projecting an image onto a surface, according to some embodiments.

FIG. 10 illustrates a front elevation view of a multifunctional writing device 100 with a projector stick 154 light source 1002 projecting an image onto a surface 1004, according to some embodiments.

The projected image onto a surface 1004 can be any technical drawing tool such as a ruler 130, a protractor 132, a set square forty-five-degree (45°) triangle 134, a set square thirty/sixty-degree (30/60°) triangle 136, and a light dot 140. The multifunctional writing device 100 can be programmed to display other drawing tools such as T-squares, ellipsographs, and so on. It is also possible to program and project images such as a tile, a hardwood, kitchen cabinet, and window etc. The projected image allows the installer to see how the finished project will look before starting the work.

The multifunctional writing device allows for projecting geometry tools that are self-leveled and auto calibrated to real-life measurement units. These tools are extremely important for carpenters, contractors, masons, construction workers, crane operators, construction inspectors, cost estimators, civil engineers, draftsmen, drywall installers, electricians, gardeners, glaziers, kitchen cabinet installers, plumbers, painters, tile installers, real estate agents, surveyors, site safety managers, and so on.

Figure 11:
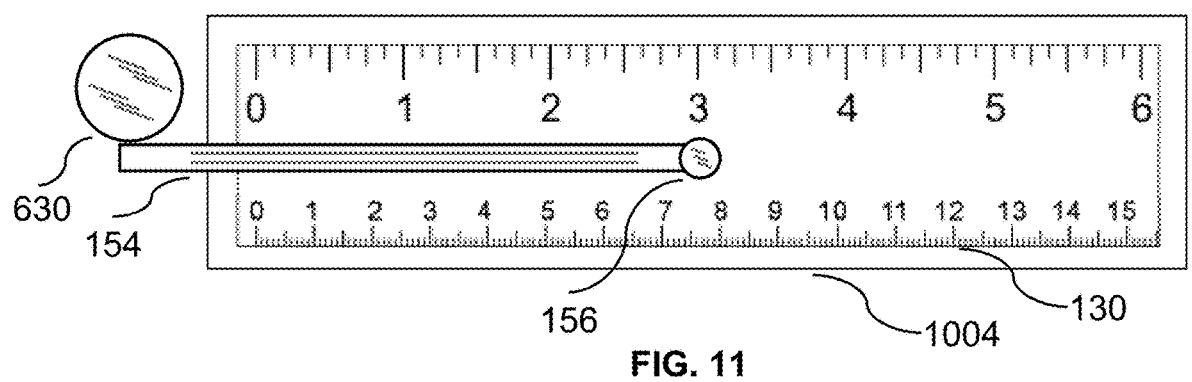
FIG. 11 illustrates a top plan view with a projector stick light source, projecting a ruler image onto a surface and calibrated to an actual size irrespective of the distance to the surface, according to some embodiments.

FIG. 11 illustrates a top plan view2 630 with a projector stick 154 light source 1002, projecting a ruler 130 image onto a surface 1004, and calibrated to an actual size irrespective of the distance to the surface, according to some embodiments.

The steps to project a ruler 130 image onto a surface 1004 are as follows:

1. Open the projector stick 154 by moving it to the right direction, wherein the projector stick 154 revolves around a pivot pin to an open position and is perpendicular to the second portion of the hollow body 150.

2. Click the projector power push button 166 to power on the projector stick 154.

3. Select the technical drawing tool ruler 130 image to project by saying the voice command "project ruler."

4. The projector stick's 154 projector stick lens 156 projects the technical drawing tool ruler 130 image onto a surface 1004, wherein the technical drawing tool ruler 130 image projected on the surface 1004 is auto leveled using a digital laser level 268 and auto calibrated to an actual size irrespective of a distance to the surface 1004 using a distance sensor 270.

5. Click the projector power push button 166 to power off the projector stick 154.

6. Close the projector stick 154 by moving it to the left direction, wherein the projector stick 154 revolves around a pivot pin to a closed position and is on top of the second portion of the hollow body 150.

Figure 12:
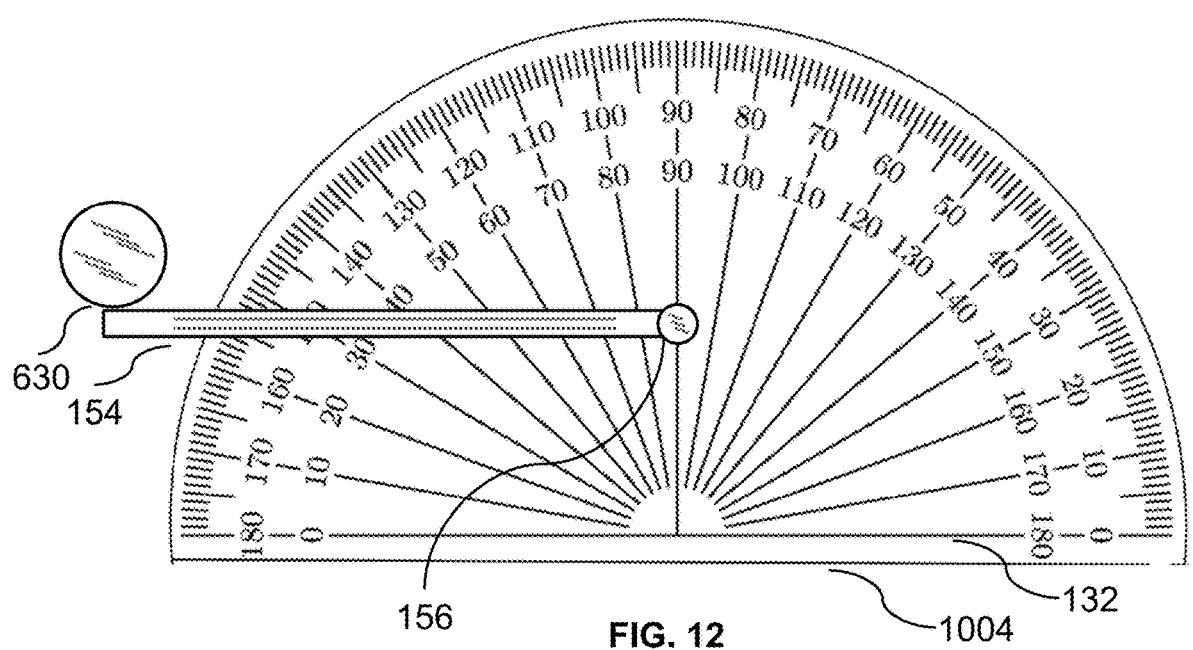
FIG. 12 illustrates a top plan view with a projector stick light source, projecting a protractor image onto a surface and calibrated to an actual size irrespective of the distance to the surface, according to some embodiments.

FIG. 12 illustrates a top plan view2 630 with a projector stick 154 light source 1002, projecting a protractor 132 image onto a surface 1004 and calibrated to an actual size irrespective of the distance to the surface, according to some embodiments.

The steps to project a protractor 132 image onto a surface 1004 are as follows:

1. Open the projector stick 154 by moving it to the right direction, wherein the projector stick 154 revolves around a pivot pin to an open position and is perpendicular to the second portion of the hollow body 150.

2. Click the projector power push button 166 to power on the projector stick 154.

3. Select the technical drawing tool protractor 132 image to project by saying the voice command "project protractor."

4. The projector stick's 154 projector stick lens 156 projects the technical drawing tool protractor 132 image onto a surface 1004, wherein the technical drawing tool protractor 132 image projected on the surface 1004 is auto leveled using a digital laser level 268 and auto calibrated to an actual size irrespective of a distance to the surface 1004 using a distance sensor 270.

5. Click the projector power push button 166 to power off the projector stick 154.

6. Close the projector stick 154 by moving it to the left direction, wherein the projector stick 154 revolves around a pivot pin to a closed position and is on top of the second portion of the hollow body 150.

Figure 13:
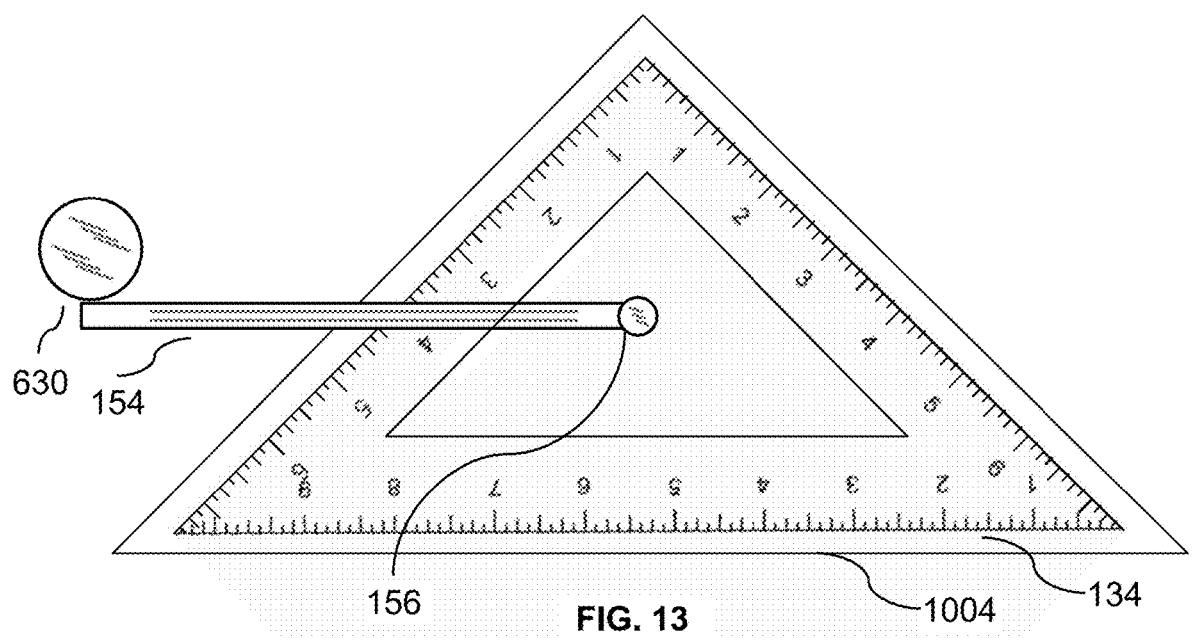
FIG. 13 illustrates a top plan view with a projector stick light source, projecting a set square forty-five-degree (45°) triangle image onto a surface and calibrated to an actual size irrespective of the distance to the surface, according to some embodiments.

FIG. 13 illustrates a top plan view2 630 with a projector stick 154 light source 1002, projecting a set square forty-five-degree (45°) triangle 134 image onto a surface 1004 and calibrated to an actual size irrespective of the distance to the surface, according to some embodiments.

The steps to project a set square forty-five-degree (45°) triangle 134 image onto a surface 1004 are as follows:

1. Open the projector stick 154 by moving it to the right direction, wherein the projector stick 154 revolves around a pivot pin to an open position and is perpendicular to the second portion of the hollow body 150.

2. Click the projector power push button 166 to power on the projector stick 154.

3. Select the technical drawing tool set square forty-five-degree (45°) triangle 134 image to project by saying the voice command "project 45 triangle."

4. The projector stick's 154 projector stick lens 156 projects the technical drawing tool set square forty-five-degree (45°) triangle 134 image onto a surface, wherein the technical drawing tool set square forty-five-degree (45°) triangle 134 image projected on the surface 1004 is auto leveled using a digital laser level 268 and auto calibrated to an actual size irrespective of a distance to the surface 1004 using a distance sensor 270.

5. Click the projector power push button 166 to power off the projector stick 154.

6. Close the projector stick 154 by moving it to the left direction, wherein the projector stick 154 revolves around a pivot pin to a closed position and is on top of the second portion of the hollow body 150.

Figure 14:
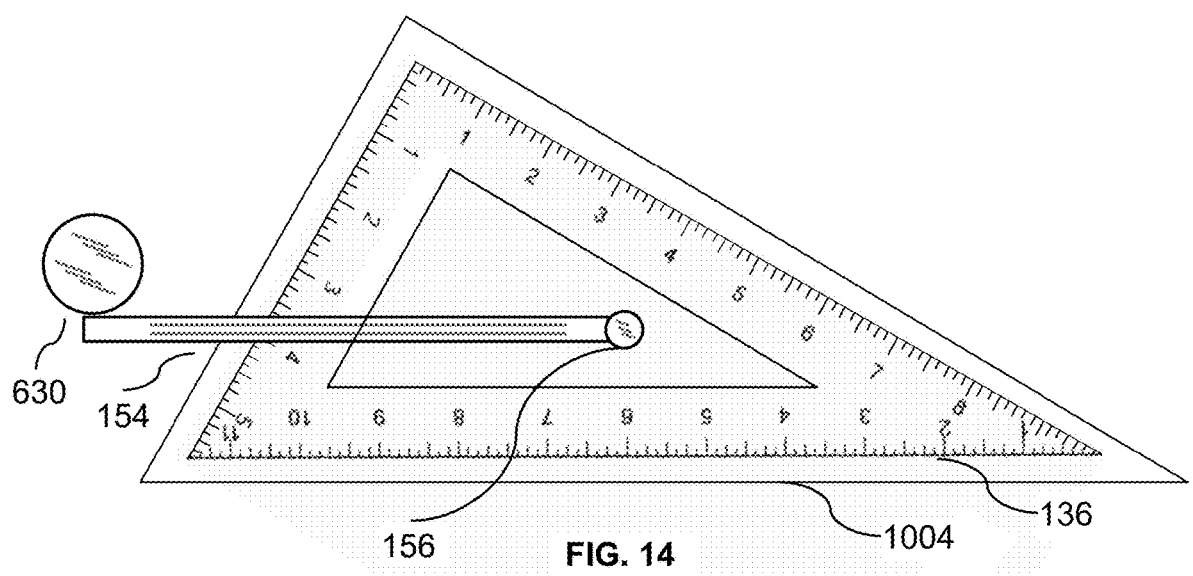
FIG. 14 illustrates a top plan view with a projector stick light source, projecting a set thirty/sixty-degree (30/60°) triangle image onto a surface and calibrated to an actual size irrespective of the distance to the surface, according to some embodiments.

FIG. 14 illustrates a top plan view2 630 with a projector stick 154 light source 1002 projecting a set thirty/sixty-degree (30/60°) triangle 136 image onto a surface 1004 and calibrated to an actual size irrespective of the distance to the surface 1004, according to some embodiments.

1. Open the projector stick 154 by moving it to the right direction, wherein the projector stick 154 revolves around a pivot pin to an open position and is perpendicular to the second portion of the hollow body 150.

2. Click the projector power push button 166 to power on the projector stick 154.

3. Select the technical drawing tool set thirty/sixty-degree (30/60°) triangle 136 image to project by saying a voice command "project 30 triangle."

4. The projector stick's 154 projector stick lens 156 projects the technical drawing tool set thirty/sixty-degree (30/60°) triangle 136 image onto a surface 1004, wherein the technical drawing tool set thirty/sixty-degree (30/60°) triangle 136 image projected on the surface 1004 is auto leveled using a digital laser level 268 and auto calibrated to an actual size irrespective of a distance to the surface 1004 using a distance sensor 270.

5. Click the projector power push button 166 to power off the projector stick 154.

6. Close the projector stick 154 by moving it to the left direction, wherein the projector stick 154 revolves around a pivot pin to a closed position and is on top of the second portion of the hollow body 150.

Figure 15:
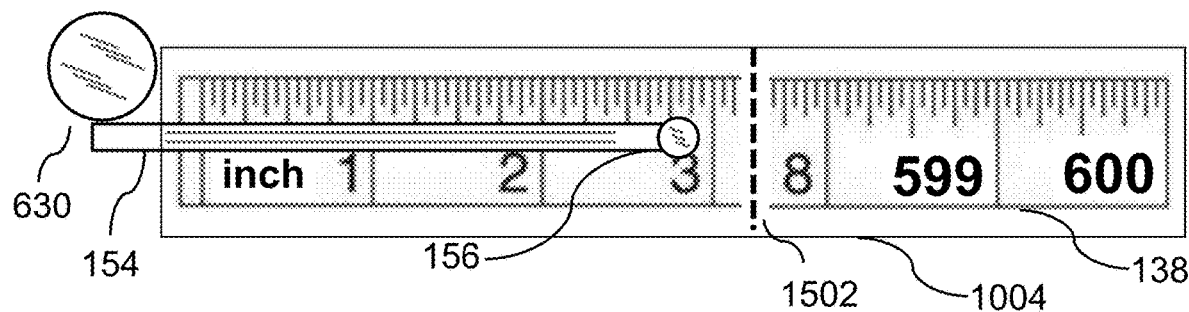
FIG. 15 illustrates a top plan view with a projector stick light source, projecting a measuring tape image onto a surface, and calibrated to an actual size irrespective of the distance to the surface, according to some embodiments.

FIG. 15 illustrates a top plan view2 630 with a projector stick 154 light source 1002, projecting a measuring tape 138 image onto a surface 1004, and calibrated to an actual size irrespective of the distance to the surface, according to some embodiments.

The steps to project a measuring tape 138 image onto a surface 1004 are as follows:

1. Open the projector stick 154 by moving it to the right direction, wherein the projector stick 154 revolves around a pivot pin to an open position and is perpendicular to the second portion of the hollow body 150.

2. Click the projector power push button 166 to power on the projector stick 154.

3. Select the technical drawing tool measuring tape 138 image to project by saying the voice command "project measuring tape." The multifunctional writing device 100 can be programmed to display measuring tape 138 image containing units like inch, centimeter, and multiple lengths like 1 m, 5 m, 10 m, 15 m or 5 ft, 10 ft, 25 ft, 50 ft and so on. The corresponding programmed voice command can be "project measuring tape 1 m", "project measuring tape 5 ft", "project measuring tape 25 ft", and so on.

4. The projector stick's 154 projector stick lens 156 projects the technical drawing tool measuring tape 138 image onto a surface 1004, wherein the technical drawing tool measuring tape 138 image projected on the surface 1004 is auto leveled using a digital laser level 268 and auto calibrated to an actual size irrespective of a distance to the surface 1004 using a distance sensor 270. In this example the projected length of the measuring tape 138 image is equal to 600 inches (50 ft). The top plan view2 broken line 1502 is used to show that entire projected image length of 1 to 600 inches is displayed.

5. Click the projector power push button 166 to power off the projector stick 154.

6. Close the projector stick 154 by moving it to the left direction, wherein the projector stick 154 revolves around a pivot pin to a closed position and is on top of the second portion of the hollow body 150.

The conventional measuring tape is one of the commonly used flexible ruler to measure size or distance. The conventional measuring tape consists of a ribbon of cloth, plastic, fiber glass, or metal strip with linear-measurement markings. The biggest advantage of the projected measuring tape 138 image is that it can be used on any type of surface and for any type of job.

Figure 16:
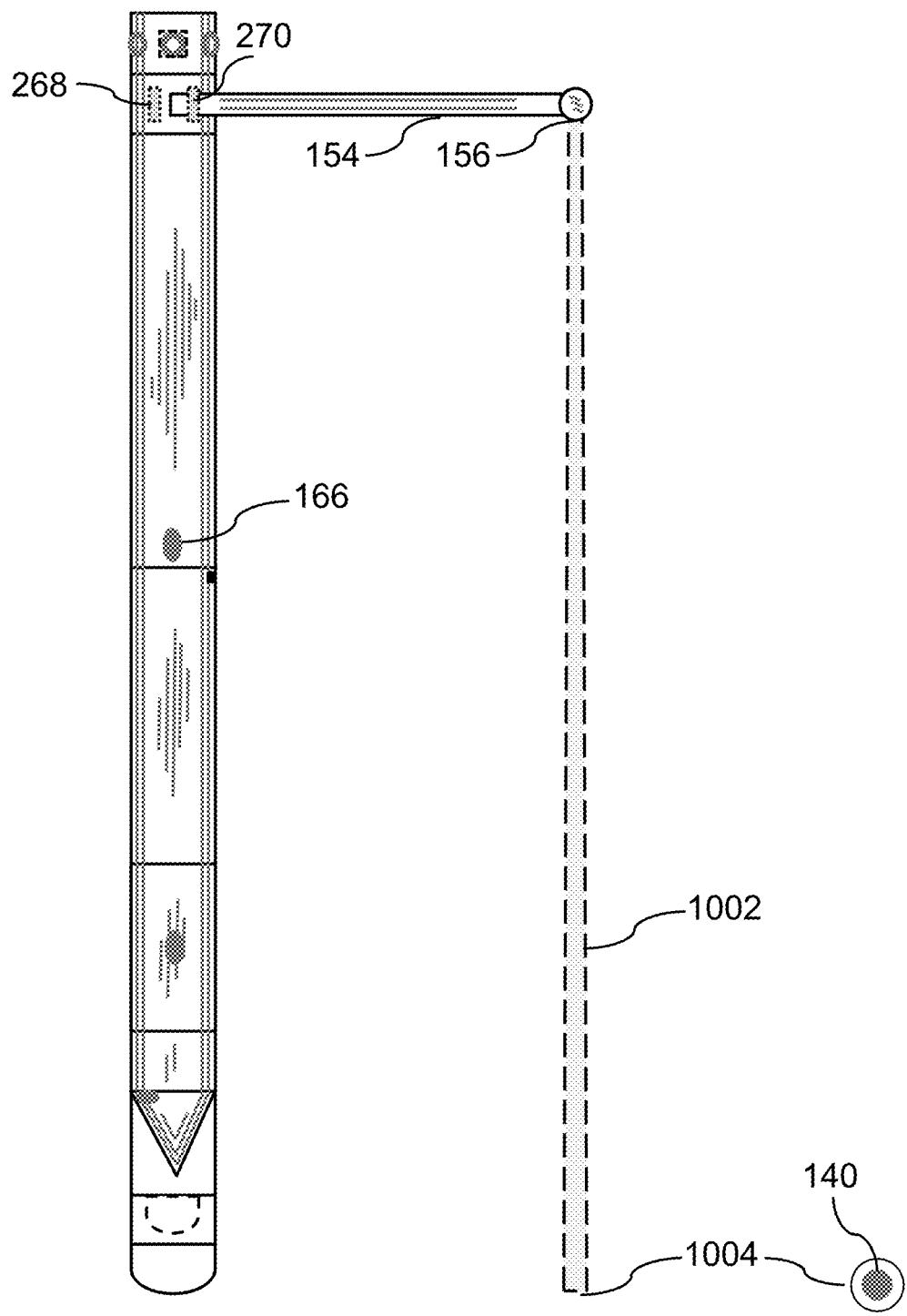
FIG. 16 illustrates a front elevation view with a projector stick light beam source, projecting a light dot image onto a surface and calibrated to an actual size irrespective of the distance to the surface, according to some embodiments.

FIG. 16 illustrates a front elevation view with a projector stick 154 light source 1002, projecting a light dot 140 image onto a surface 1004 and calibrated to an actual size irrespective of the distance to the surface 1004, according to some embodiments.

1. Open the projector stick 154 by moving it to the right direction, wherein the projector stick 154 revolves around a pivot pin to an open position and is perpendicular to the second portion of the hollow body 150.

2. Click the projector power push button 166 to power on the projector stick 154.

3. Select the technical drawing tool light dot 140 image to project by saying the voice command "project light dot."

4. The projector stick 154 projector stick lens 156 projects the technical drawing tool light dot 140 image onto a surface 1004, wherein the technical drawing tool light dot 140 image projected on the surface 1004 is auto leveled using a digital laser level 268 and auto calibrated to an actual size irrespective of a distance to the surface 1004 using a distance sensor 270.

5. Click the projector power push button 166 to power off the projector stick 154.

6. Close the projector stick 154 by moving it to the left direction, wherein the projector stick 154 revolves around a pivot pin to a closed position and is on top of the second portion of the hollow body 150.

Figure 17:
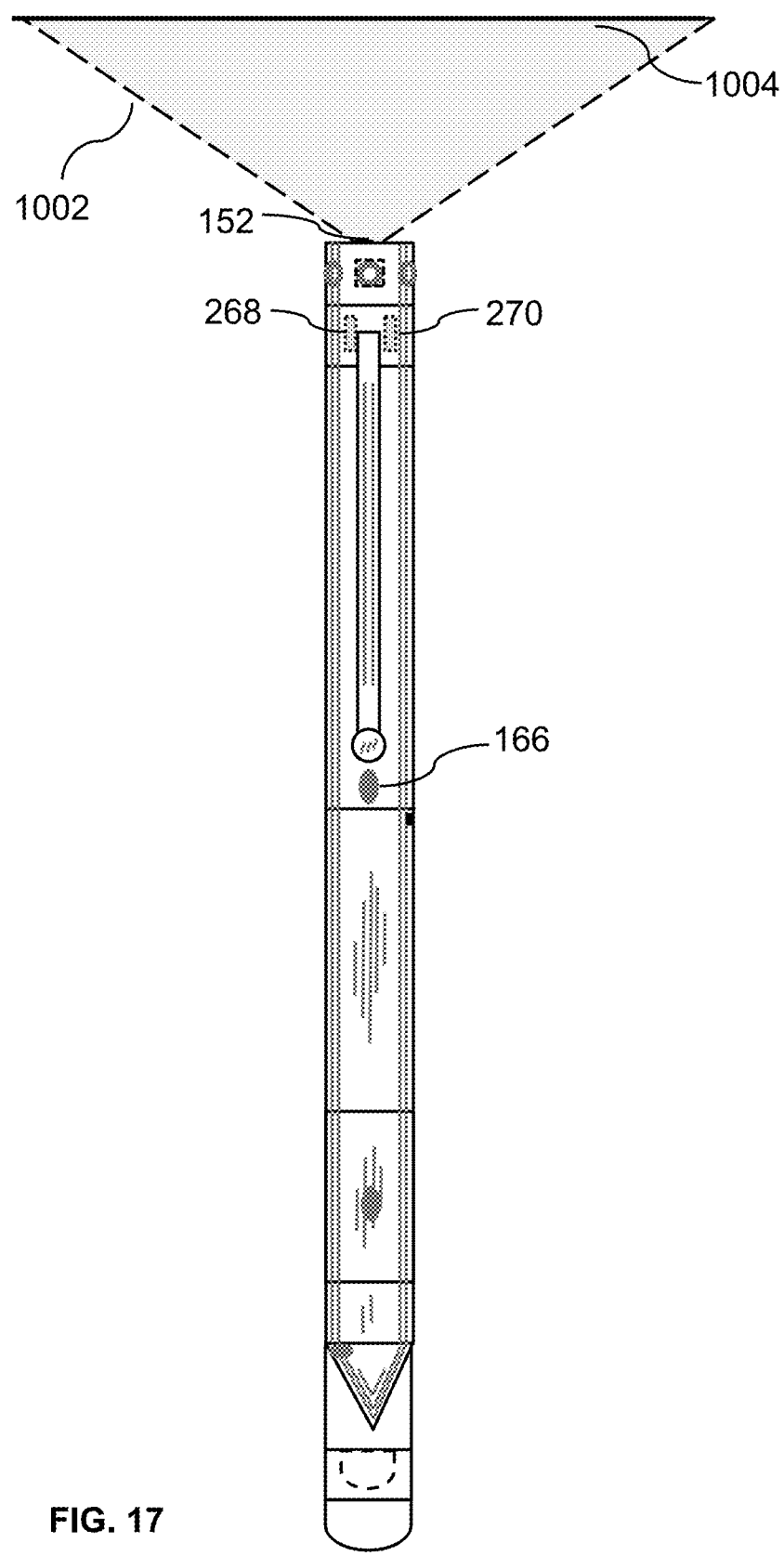
FIG. 17 illustrates a front elevation view of a multifunctional writing device with a projector pen light source, projecting an image onto a surface, according to some embodiments.

FIG. 17 illustrates a front elevation view of a multifunctional writing device 100 with a projector pen 152 light source 1002, projecting an image onto a surface 1004, according to some embodiments.

The projected image onto a surface 1004 can be any technical drawing tool such as a ruler 130, a protractor 132, a set square forty-five-degree (45°) triangle 134, a set square thirty/sixty-degree (30/60°) triangle 136, and a light dot 140. The multifunctional writing device 100 can be programmed to display other drawing tools such as T-squares, ellipsographs, and so on.

Figure 18:
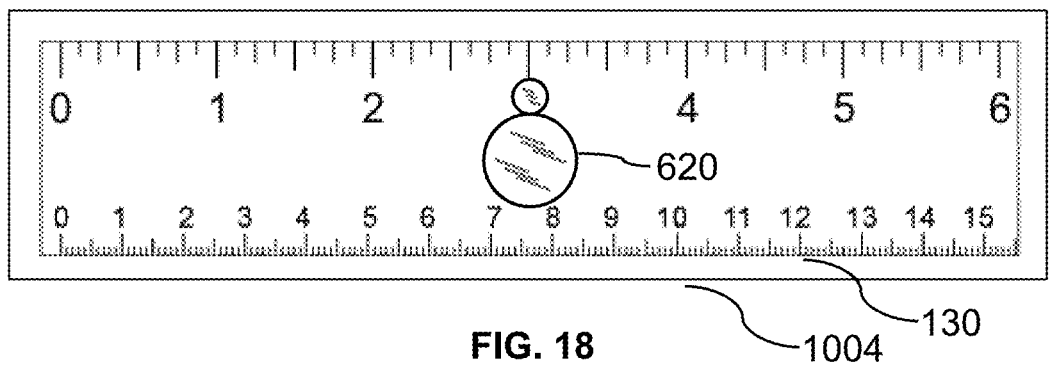
FIG. 18 illustrates a bottom plan view with a projector pen light source, projecting a ruler image onto a surface and calibrated to an actual size irrespective of the distance to the surface, according to some embodiments.

FIG. 18 illustrates a bottom plan view1 620 with a projector pen 152 light source 1002, projecting a ruler 130 image onto a surface 1004 and calibrated to an actual size irrespective of the distance to the surface 1004, according to some embodiments.

The steps to project a ruler 130 image onto a surface 1004 are as follows:

1. Click the projector power push button 166 to power on the projector pen 152.

2. Select the technical drawing tool ruler 130 image to project by saying the voice command "project ruler."

3. The projector pen 152 projects the technical drawing tool ruler 130 image onto a surface 1004, wherein the technical drawing tool ruler 130 image projected on the surface 1004 is auto leveled using a digital laser level 268 and auto calibrated to an actual size irrespective of a distance to the surface 1004 using a distance sensor 270.

4. Click the projector power push button 166 to power off the projector pen 152.

Figure 19:
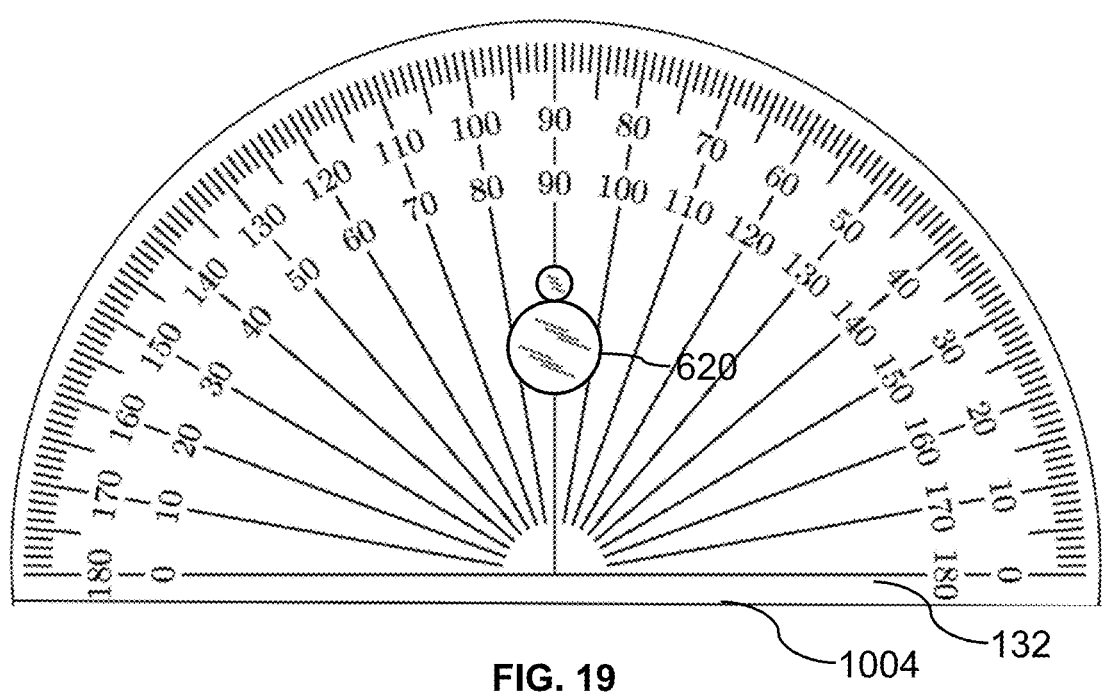
FIG. 19 illustrates a bottom plan view with a projector pen light source, projecting a protractor image onto a surface and calibrated to an actual size irrespective of the distance to the surface, according to some embodiments.

FIG. 19 illustrates a bottom plan view1 620 with a projector pen 152 light source 1002, projecting a protractor 132 image onto a surface 1004 and calibrated to an actual size irrespective of the distance to the surface 1004, according to some embodiments.

The steps to project a protractor 132 image onto a surface 1004 are as follows:

1. Click the projector power push button 166 to power on the projector pen 152.

2. Select the technical drawing tool protractor 132 image to project by saying the voice command "project protractor."

3. The projector pen 152 projects the technical drawing tool protractor 132 image onto a surface 1004, wherein the technical drawing tool protractor 132 image projected on the surface 1004 is auto leveled using a digital laser level 268 and auto calibrated to an actual size irrespective of a distance to the surface 1004 using a distance sensor 270.

4. Click the projector power push button 166 to power off the projector pen 152.

Figure 20:
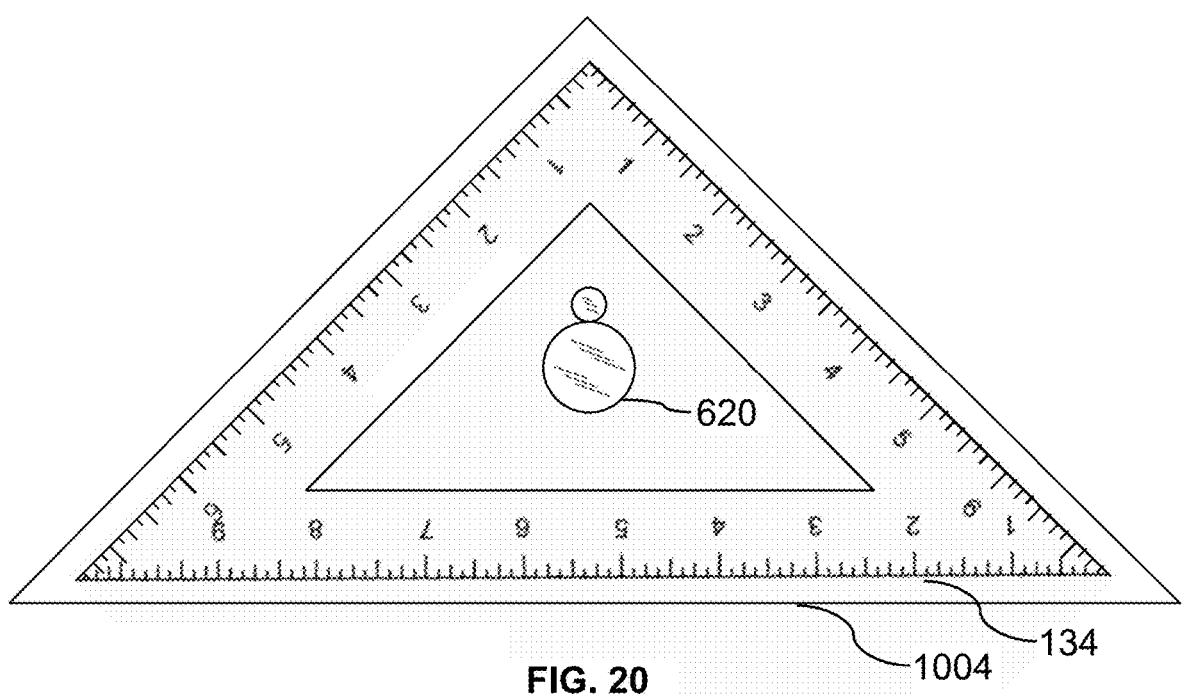
FIG. 20 illustrates a bottom plan view with a projector pen light source, projecting a set square forty-five-degree (45°) triangle image onto a surface and calibrated to an actual size irrespective of the distance to the surface, according to some embodiments.

FIG. 20 illustrates a bottom plan view1 620 with a projector pen 152 light source 1002, projecting a set square forty-five-degree (45°) triangle 134 image onto a surface 1004 and calibrated to an actual size irrespective of the distance to the surface 1004, according to some embodiments.

The steps to project a set square forty-five-degree (45°) triangle 134 image onto a surface 1004 are as follows:

1. Click the projector power push button 166 to power on the projector pen 152.
2. Select the technical drawing tool set square forty-five-degree (45°) triangle 134 image to project by saying the voice command "project 45 triangle."
3. The projector pen 152 projects the technical drawing tool set square forty-five-degree (45°) triangle 134 image onto a surface 1004, wherein the technical drawing tool set square forty-five-degree (45°) triangle 134 image projected on the surface 1004 is auto leveled using a digital laser level 268 and auto calibrated to an actual size irrespective of a distance to the surface 1004 using a distance sensor 270.
4. Click the projector power push button 166 to power off the projector pen 152.

Figure 21:
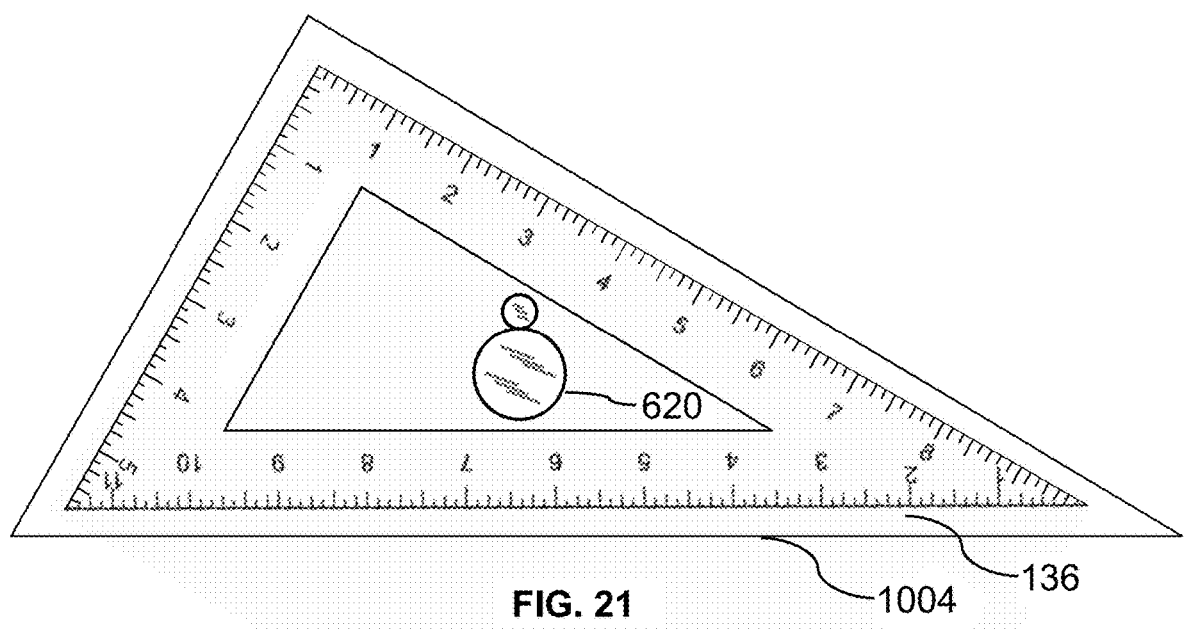
FIG. 21 illustrates a bottom plan view with a projector pen light source projecting a set thirty/sixty-degree (30/60°) triangle image onto a surface and calibrated to an actual size irrespective of the distance to the surface, according to some embodiments.

FIG. 21 illustrates a bottom plan view1 620 with a projector pen 152 light source 1002 projecting a set thirty/sixty-degree (30/60°) triangle 136 image onto a surface 1004 and calibrated to an actual size irrespective of the distance to the surface 1004, according to some embodiments.

The steps to project a set thirty/sixty-degree (30/60°) triangle 136 image onto a surface 1004 are as follows:

1. Click the projector power push button 166 to power on the projector pen 152.
2. Select the technical drawing tool set thirty/sixty-degree (30/60°) triangle 136 image to project by saying a voice command "project 30 triangle."
3. The projector pen 152 projects the technical drawing tool set thirty/sixty-degree (30/60°) triangle 136 image onto a surface 1004, wherein the technical drawing tool set thirty/sixty-degree (30/60°) triangle 136 image projected on the surface 1004 is auto leveled using a digital laser level 268 and auto calibrated to an actual size irrespective of a distance to the surface 1004 using a distance sensor 270.
4. Click the projector power push button 166 to power off the projector pen 152.

Figure 22:
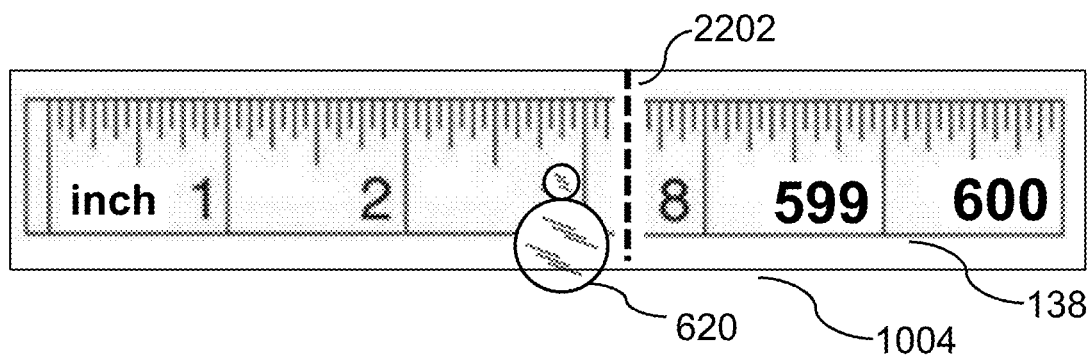
FIG. 22 illustrates a bottom plan view with a projector pen light source, projecting a measuring tape image onto a surface and calibrated to an actual size irrespective of the distance to the surface, according to some embodiments.

FIG. 22 illustrates a bottom plan view1 620 with a projector pen 152 light source 1002, projecting a measuring tape 138 image onto a surface 1004 and calibrated to an actual size irrespective of the distance to the surface 1004, according to some embodiments.

The steps to project a measuring tape 138 image onto a surface 1004 are as follows:

1. Click the projector power push button 166 to power on the projector pen 152.
2. Select the technical drawing tool measuring tape 138 image to project by saying the voice command "project measuring tape." The multifunctional writing device 100 can be programmed to display measuring tape 138 image containing units like inch, centimeter, and multiple lengths like 1 m, 5 m, 10 m, 15 m or 5 ft, 10 ft, 25 ft, 50 ft and so on. The corresponding programmed voice command can be "project measuring tape 1 m", "project measuring tape 5 ft", "project measuring tape 25 ft", and so on.
3. The projector pen 152 projects the technical drawing tool measuring tape 138 image onto a surface 1004, wherein the technical drawing tool measuring tape 138 image projected on the surface 1004 is auto leveled using a digital laser level 268 and auto calibrated to an actual size irrespective of a distance to the surface 1004 using a distance sensor 270. In this example the projected length of the measuring tape 138 image is equal to 600 inches (50 ft). The bottom plan view1 broken line 2202 is used to show that entire projected image length of 1 to 600 inches is displayed.
4. Click the projector power push button 166 to power off the projector pen 152.

Figure 23:
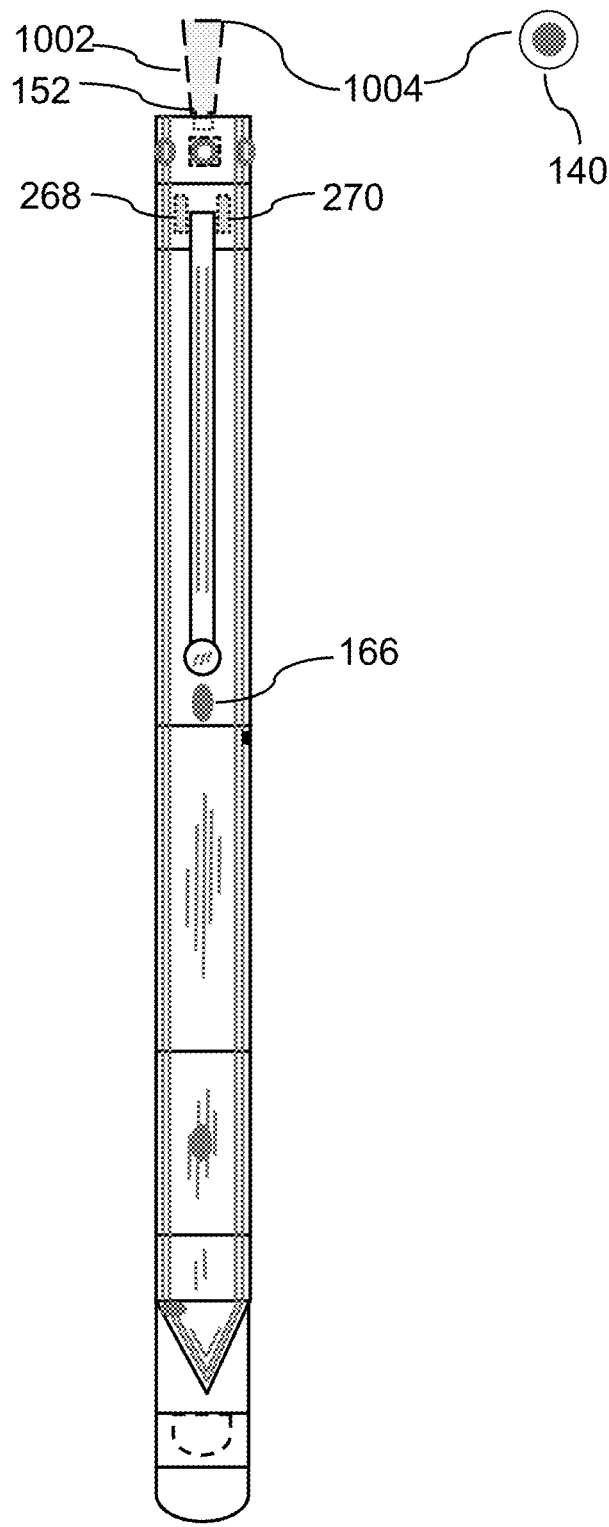
FIG. 23 illustrates a bottom elevation view with a projector pen light beam source, and top plan view with a projector pen light source, projecting a light dot image onto a surface and calibrated to an actual size irrespective of the distance to the surface, according to some embodiments.

FIG. 23 illustrates a top plan view with a projector pen 152 light source 1002 projecting a light dot 140 image onto a surface 1004 and calibrated to an actual size irrespective of the distance to the surface 1004, according to some embodiments.

The steps to project a light dot 140 image onto a surface 1004 are as follows:

1. Click the projector power push button 166 to power on the projector pen 152.
2. Select the technical drawing tool light dot 140 image to project by saying the voice command "project light dot."
3. The projector pen 152 projects the technical drawing tool light dot 140 image onto a surface 1004, wherein the technical drawing tool light dot 140 image projected on the surface 1004 is auto leveled using a digital laser level 268 and auto calibrated to an actual size irrespective of a distance to the surface 1004 using a distance sensor 270.
4. Click the projector power push button 166 to power off the projector pen 152.

Figure 24:
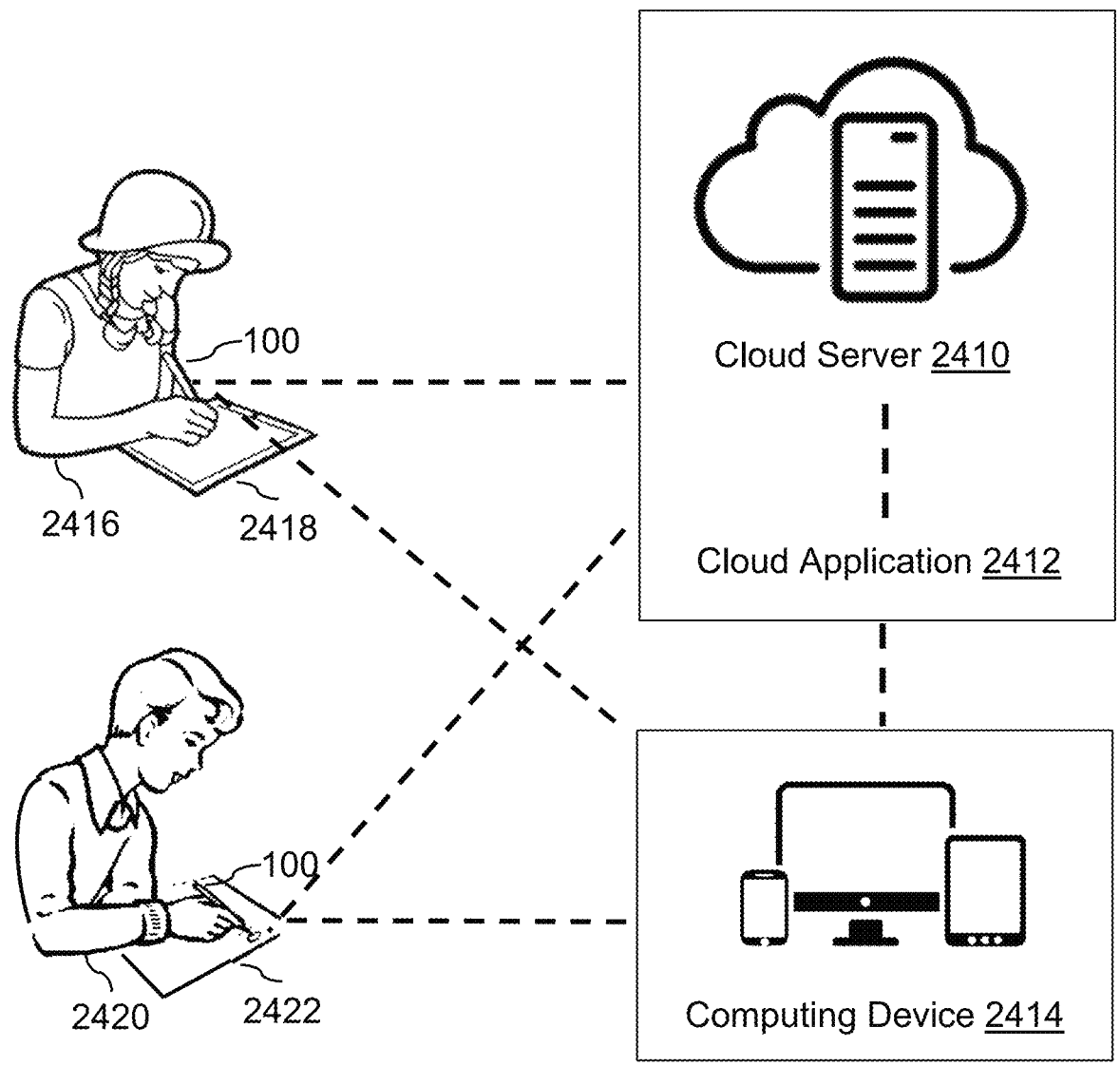
FIG. 24 illustrates an overall system and method comprising a multifunctional writing device, a cloud server, a cloud application software, a computing device, and a student taking an examination, according to some embodiments.

FIG. 24 illustrates an overall system and method comprising a multifunctional writing device 100, a cloud server 2410, a cloud application 2412, a computing device 2414, and students 2416 and 2420 taking an examination, according to some embodiments.

The multifunctional writing device 100 allows for automatic exam proctoring and grading.

The overall system of FIG. 24 shows a method of auto proctoring and auto grading of an exam taken on a touch sensitive device 2418 comprising operating steps of:

1. Powering on a multifunctional writing device 100 projector pen 152 to an on state using a projector power push button 166.
2. Holding the multifunctional writing device 100 in the hand using two fingers on top of the first portion of the hollow body 110 in front of the student 2416.
3. Auto authentication of the student 2416 taking an exam using three-factor authentication of a finger touch ID using a touch ID sensitive barrel 124, a face ID using a set of cameras 158-164, and an exam ID. The exam ID is provided by the institution, administrator or a teacher conducting the exam. The exam ID can be a barcode, QR code, or unique identifier.

The exam ID can be read by a set of cameras 158-164 or an imaging system 142.

4. Auto proctoring of the student 2416 taking the exam by video recording using a set of cameras 158-164, monitoring sound using a microphone 274, motion using a motion sensor 282, and auto detecting the presence of a human body in an area of interest around the multifunctional writing device 100 other than the student 2416 taking the exam, wherein a suspicious activity sends an alert to a cloud server 2410 or a computing device 2414.
5. Removing an eraser cap 822, wherein a student 2416 takes an exam by answering a set of questions using a stylus 118 on a touch sensitive device 2418, and wherein the set of answers and video recording are transmitted to a cloud server 2410 or a computing device 2414, wherein the cloud application 2412 or computing device 2414 auto grades the set of answers after the student 2416 has completed the exam.

The multifunctional writing device 100 can work asynchronously where it is not connected with the cloud server 2410 or computing device 2414. This allows the multifunctional writing device 100 to work without internet access. The complete exam session taken by the student 2416 on a touch sensitive device 2418 can be recorded in the multifunctional writing device 100 secure digital card and transmitted to the cloud server 2410 or computing device 2414 when the connection is made via Bluetooth, Wi-Fi or Cellular network 284 for scoring and grading. Cloud server 2410, cloud application 2412, and computing device 2424 can send and receive the data in standardized format using the multifunctional writing device 100 application programming interface (API).

6. Powering off the multifunctional writing device 100 projector pen 152 to an off state using the projector power push button 166.

The overall system of FIG. 24 further shows the method of auto proctoring and auto grading of an exam taken on a paper 2422 comprising operating steps of:

1. Powering on a multifunctional writing device 100 projector pen 152 to an on state using a projector power push button 166.

2. Holding the multifunctional writing device 100 in the hand using two fingers on top of the first portion of the hollow body 110 in front of the student 2420.

3. Auto authentication of the student 2416 taking an exam using three-factor authentication of a finger touch ID using a touch ID sensitive barrel 124, a face ID using a set of cameras 158-164, and an exam ID. The exam ID is provided by the institution or a teacher conducting the exam. The exam ID can be a barcode, QR code, or unique identifier. The exam ID can be read by a set of cameras 158-164 or an imaging system 142.

4. Auto proctoring of the student 2420 taking the exam by video recording using a set of cameras 158-164, monitoring sound using a microphone 274, motion using a motion sensor 282, and auto detecting the presence of a human body in an area of interest around the multifunctional writing device 100 other than the student 2420 taking the exam, wherein a suspicious activity sends an alert to a cloud server 2410 or a computing device 2414.

5. Removing an eraser 822 and a stylus cap 824, wherein a student 2420 takes an exam by answering a set of questions using a pencil 112 on paper 2422, wherein the set of answers is converted to digital data using an imaging system 142 and transmitted along with the video recording to a cloud server 2410 or a computing device 2414, wherein the cloud application 2412 or computing device 2414 auto grades the set of answers after the student 2420 has completed the exam.

The multifunctional writing device 100 can work asynchronously where it is not connected with the cloud server 2410 or computing device 2414. This allows the multifunctional writing device 100 to work without internet access. The complete exam session taken by the student 2420 on a paper 2418 can be recorded in the multifunctional writing device 100 secure digital card and transmitted to the cloud server 2410 or computing device 2414 when the connection is made via Bluetooth, Wi-Fi or Cellular network 284 for scoring and grading. Cloud server 2410, cloud application 2412, and computing device 2424 can send and receive the data in standardized format using the multifunctional writing device 100 application programming interface (API).

6. Powering off the multifunctional writing device 100 projector pen 152 to an off state using the projector power push button 166.

The above methods have many advantages as listed below:

1. Auto proctoring does not require an onsite or a remote proctor.

2. Auto grading does not require an onsite or a remote instructor.

3. Exams can be taken in a synchronous or asynchronous way. The asynchronous way, where interaction does not take place at the same time, is especially beneficial to a student who might not be able to take an exam if they are sick or busy with other school activities.

4. Auto proctoring offers students and test takers the freedom to take a proctored exam where and when they want. There is no more scheduling of an exam, paying for an onsite proctor, or relying on instructors or remote proctors to catch every instance of cheating.

5. Auto proctoring protects a student's privacy. The exam video recording session is auto analyzed and erased after a pre-specified retention period or the student grade has been reported.

6. Multifunctional writing device 100 connects to cloud server 2410 and computing device 2412. This allows the large institution to take advantage of the cloud server 2410 and a cloud application 2412 and reduce the cost to give an exam. The individual instructor and small institution can use their computing devices 2414 to give an exam.

7. Before the exam, the multifunctional writing device 100 is used for student 2416, 2420 authentication using a touch ID, a face ID, and an exam ID, and maintains continuous identity verification throughout the exam.

8. During the exam session, the multifunctional writing device 100 monitors and records for a variety of events, behaviors, motions, and patterns typically associated with cheating.

9. Once the exam is complete, a detailed and optimized report of the auto proctoring session is provided to the test instructor or administrator for review. The report includes anomalies or aberrations, or suspicious activities.

10. The cloud server 2410, cloud application 2412, and computing device 2414 run state of the art machine learning algorithms to data mine the entire exam video recording session of the student to detect any suspicious activities and flag them before reporting the final grades.

The COVID-19 pandemic has created unprecedented challenges for the education industry. This includes teachers, students and schools with primary concerns rooted in ensuring data security, student privacy, and online test-taking integrity. The ubiquitous intelligent multifunctional writing device 100 addresses these concerns.

CONCLUSION

A multifunctional writing device includes a hollow body, wherein the hollow body comprises one or more cavities configured to store a mechanical pencil, a multifunctional drawing tool, a compass needle, a stylus, an eraser, a USB flash drive, an imaging system, a projector pen, a set of cameras, and attaches a projector stick. The first writing member comprises a lead and a mechanical pencil system being provided in a first portion of the hollow body and a touch ID sensitive barrel. A multifunctional drawing tool is magnetically attached by a magnetic lock and stored in a multifunctional drawing tool cavity in the first portion of the hollow body. A compass needle is attached by a magnetic lock and stored in a compass needle cavity and runs on the opposite side of the multifunctional drawing tool cavity in the first portion of the hollow body. A second projector member comprises a projector pen and attaches a projector stick. The multifunctional writing device projector pen and projector stick allow for projecting self-leveled and auto calibrated geometry tools like rulers, compasses, protractors, set squares, measuring tapes, geometric drawing templates, T-squares, ellipsographs, and so on. The first portion of the hollow body is at the opposite end of the second portion of the hollow body. A method for digitizing the written data on paper and a system for secure, auto proctored, and auto grading of examinations is provided.

The multifunctional writing device allows for three-factor authentications based on touch ID, face ID, and exam ID before the start of an exam. In addition, it records the complete exam session and tags it with suspicious behavior, obviating need for the presence of a physical or real-time virtual proctor.

The multifunctional writing device allows for projecting self-leveled and auto calibrated to real-life measurement units of geometry tools like rulers, compasses, protractors, set squares, measuring tapes, geometric drawing templates, T-squares, ellipsographs, and so on. These tools are extremely important for carpenters, contractors, masons, construction workers, crane operators, construction inspectors, cost estimators, civil engineers, draftsmen, drywall installers, electricians, gardeners, glaziers, kitchen cabinet installers, plumbers, painters, tile installers, real estate agents, surveyors, site safety managers, and so on.

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software, or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system) and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

The invention claimed is:

1. A multifunctional writing device comprising:
a hollow body, wherein the hollow body comprises one or more cavities configured to store a mechanical pencil, a multifunctional drawing tool, a compass needle, a stylus, an eraser, a USB flash drive, an imaging system, a projector pen, a set of cameras, and attaches a projector stick;
a first writing member comprising a first writing tip, wherein the first writing member comprises a lead, and a mechanical pencil system being provided in a first portion of the hollow body, a touch ID sensitive barrel, and wherein the first writing tip is axial with respect to the hollow body;
a second projector member comprising a second projector pen, wherein the second projector member comprises a projector pen system being provided in a second portion of the hollow body, and wherein the second projector pen is axial with respect to the hollow body, and wherein the first portion of the hollow body is at the opposite end of the second portion of the hollow body;
a mechanical pencil push button;
a compass needle push button;
a projector power push button which allows powering on or off of a projector pen, and a projector stick;
a pivot pin system which allows opening or closing a multifunctional drawing tool, a compass needle, and a projector stick;
a magnetic lock which attaches and stores a multifunctional drawing tool, and a compass needle inside a cavity;
a magnetic lock which attaches a multifunctional drawing tool around two pivot pins and top edges in an open position;
wherein a magnetic lock is formed when a permanent magnet object attaches itself to a ferromagnetic material made object; and
wherein a magnetic lock is formed when two permanent objects with opposite polarities attach to each other.

2. The multifunctional writing device of claim 1, wherein a multifunctional drawing tool is magnetically attached by a magnetic lock and stored in a multifunctional drawing tool cavity in the first portion of the hollow body.

3. The multifunctional writing device of claim 2, wherein a compass needle is attached by a magnetic lock and stored in a compass needle cavity and runs on the opposite side of the multifunctional drawing tool cavity in the first portion of the hollow body.

4. The multifunctional writing device of claim 3, wherein a multifunctional drawing tool is removed from a multifunctional drawing tool cavity by pulling the rectangular strip top portion.

5. The multifunctional writing device of claim 4, wherein a multifunctional drawing tool's two rectangular strips revolve around two pivot pins to open or close.

6. The multifunctional writing device of claim 5, wherein a multifunctional drawing tool is attached in an open position by a magnetic lock around two pivot pins and top edges.

7. The multifunctional writing device of claim 6, wherein a compass needle revolves around a pivot pin to open or close.

8. The multifunctional writing device of claim 7, wherein the tip of the first portion of the hollow body comprises an eraser cap over a tip of the mechanical pencil system.

9. The multifunctional writing device of claim 8, wherein an eraser cap comprises a stylus.

10. The multifunctional writing device of claim 9, wherein a USB flash drive is stored in the first portion of the hollow body.

11. The multifunctional writing device of claim 10, wherein an imaging system is stored in the first portion of the hollow body.

12. The multifunctional writing device of claim 11, wherein a set of cameras is attached and stored in a camera cavity in the second portion of the hollow body.

13. The multifunctional writing device of claim 12, wherein a projector stick is magnetically attached to the second portion of the hollow body, wherein the projector stick revolves around a pivot pin to open or close.

14. The multifunctional writing device of claim 13, wherein a projector stick is axial with respect to the second portion of the hollow body.

15. The method comprising:
a multifunctional writing device, wherein the multifunctional device comprises a hollow body, wherein the hollow body comprises one or more cavities configured to store a mechanical pencil, a multifunctional drawing tool, a compass needle, a stylus, an eraser, a USB flash drive, an imaging system, a touch ID sensitive barrel, a mechanical pencil push button, a compass needle push button, a projector pen, a set of cameras, a projector power push button, and attaches a projector stick;

a cloud server;
a cloud application;
a computing device; and
a student.

16. The method of claim 15, further operating a projector pen of a multifunctional writing device by a student comprising the following steps:
   powering on the projector pen to an on state using a projector power push button;
   selecting a technical drawing tool image to project using a voice command;
   A projector pen projects the technical drawing tool image onto a surface, wherein the technical drawing tool image projected on the surface is auto leveled using a digital laser level and auto calibrated to an actual size irrespective of a distance to the surface using a distance sensor; and
   powering off the projector pen to an off state using the projector power push button.

17. The method of claim 16, further operating a projector stick of a multifunctional writing device by a user comprising the following steps:
   opening the projector stick by moving it to the right direction, wherein the projector stick revolves around a pivot pin to an open position and is perpendicular to the hollow body;
   powering on a projector stick to an on state using a projector power push button;
   selecting a technical drawing tool image to project using a voice command;
   a projector stick projects the technical drawing tool image on a surface, wherein the technical drawing tool image projected on the surface is auto leveled using a digital laser level and auto calibrated to an actual size irrespective of a distance to the surface using a distance sensor;
   powering off a projector stick to an off state using a projector power push button; and
   closing the projector stick by moving it to the left direction, wherein the projector stick revolves around a pivot pin to a closed position and is on top of the second portion of the hollow body.

18. The method of claim 17, further auto proctoring and auto grading of an exam taken on a touch sensitive device comprising operating steps of:
   powering on a multifunctional writing device projector pen to an on state using a projector power push button;
   holding the multifunctional writing device in a hand using two fingers on top of a first portion of the hollow body in front of a student;
   auto authentication of a student taking an exam using three-factor authentication of a finger touch ID, a face ID, and an exam ID;
   auto proctoring of a student taking the exam by video recording using a set of cameras, monitoring sound, motion, and auto detecting the presence of a human body in an area of interest around the multifunctional writing device other than the student taking an exam, wherein a suspicious activity sends an alert to a cloud server or a computing device;
   removing an eraser cap, wherein a student takes an exam by answering a set of questions using a stylus on a touch sensitive device, and wherein a set of answers and video recording are transmitted to a cloud server or a computing device, wherein a cloud application or a computing device auto grades the set of answers after the student has completed the exam; and
   powering off the multifunctional writing device projector pen to an off state using the projector power push button.

19. The method of claim 18, further auto proctoring and auto grading of an exam taken on a paper comprising operating steps of:
   powering on a multifunctional writing device projector pen to an on state using a projector power push button;
   holding the multifunctional writing device in a hand using two fingers on top of a first portion of the hollow body in front of a student;
   auto authentication of a student taking an exam using three-factor authentication of a finger touch ID, a face ID, and an exam ID;
   auto proctoring of a student taking the exam by video recording using a set of cameras, monitoring sound, motion, and auto detecting the presence of a human body in an area of interest around the multifunctional writing device other than the student taking an exam, wherein a suspicious activity sends an alert to a cloud server or a computing device;
   removing an eraser and a stylus cap, wherein a student takes an exam by answering a set of questions using a pencil on paper, wherein a set of answers is converted to digital data using an imaging system and transmitted along with a video recording to a cloud server or a computing device, wherein a cloud application or computing device auto grades the set of answers after the student has completed the exam; and
   powering off the multifunctional writing device projector pen to an off state using the projector power push button.

* * * * *